US008081330B2

(12) United States Patent
Doi et al.

(10) Patent No.: US 8,081,330 B2
(45) Date of Patent: Dec. 20, 2011

(54) DATA OUTPUTTING APPARATUS, AND RECORDING MEDIUM IN WHICH DATA OUTPUTTING PROGRAM IS RECORDED

(75) Inventors: Takahiro Doi, Toyokawa (JP); Yoshiki Nakazawa, Toyokawa (JP); Shiro Umeda, Toyokawa (JP); Yasuhiro Ishihara, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1096 days.

(21) Appl. No.: 11/242,956

(22) Filed: Oct. 5, 2005

(65) Prior Publication Data

US 2006/0227377 A1 Oct. 12, 2006

(30) Foreign Application Priority Data

Apr. 8, 2005 (JP) ................................ 2005-112295

(51) Int. Cl.
*G06F 3/12* (2006.01)
*G06K 15/00* (2006.01)

(52) U.S. Cl. ...................... 358/1.15; 358/1.16; 358/1.17

(58) Field of Classification Search ........................ None
See application file for complete search history.

(56) References Cited

U.S. PATENT DOCUMENTS 5,287,194 A * 2/1994 Lobiondo ..................... 358/296
5,717,841 A * 2/1998 Farrell et al. ................. 358/1.15
5,923,826 A * 7/1999 Grzenda et al. .............. 358/1.15
6,016,387 A 1/2000 Yoshida
6,125,249 A * 9/2000 Ootsuka et al. ................. 399/87
7,126,707 B2 * 10/2006 Takeo et al. .................. 358/1.15
2002/0141802 A1 * 10/2002 Yoshioka et al. ............... 400/76
2003/0090695 A1 * 5/2003 Murata ........................ 358/1.13
2003/0174360 A1 * 9/2003 Ohshima ...................... 358/1.15
2003/0184796 A1 * 10/2003 Kokubo et al. .............. 358/1.15
2004/0126122 A1 * 7/2004 Kanamoto et al. .............. 399/20
2004/0165213 A1 * 8/2004 Han ............................ 358/1.15
2004/0223018 A1 * 11/2004 Nagai ............................ 347/14
2004/0258277 A1 * 12/2004 Ueda ............................ 382/100
2005/0010610 A1 1/2005 Nishimura
2006/0092451 A1 * 5/2006 Odagiri ........................ 358/1.14

FOREIGN PATENT DOCUMENTS

JP 4-150369 A 5/1992
JP 7-162574 A 6/1995
JP 11-129557 5/1999
JP 2000-209373 7/2000
JP 2001-127928 A 5/2001
JP 2002-218120 8/2002
JP 2005-044345 2/2005

OTHER PUBLICATIONS

Notification of Reasons for Refusal dated Jul. 24, 2007.
Decision of Refusal issued Jan. 22, 2008 in JP 2005-112295, and translation thereof.

* cited by examiner

*Primary Examiner* — Benny Tieu
*Assistant Examiner* — Fan Zhang
(74) *Attorney, Agent, or Firm* — Buchanan Ingersoll & Rooney PC

(57) ABSTRACT

A data outputting apparatus, includes a box capable of storing data in a sorted manner, an outputting portion for outputting the data stored in the box, a data number setting portion for setting the number of data to be stored in the box, and a controller for making the outputting portion output the data stored in the box when the number of data stored in the box has reached the set number of data.

4 Claims, 24 Drawing Sheets

Set information administration table

| BOX | TYPE OF CONDITION | CONTENTS OF CONDITION | PRINT MODE |
|---|---|---|---|
| 1 | Time | 12:00 | Color/A4/single-side printing |
| 2 | Time | 13:00 | Monochrome/A3/single-side printing |
| 3 | Number of data | 5 data | Color/A4/double-side printing |

DATA OUTPUTTING APPARATUS, AND RECORDING MEDIUM IN WHICH DATA OUTPUTTING PROGRAM IS RECORDED

This application claims priority under 35 U.S.C. §119 to Japanese Patent Application No. 2005-112295 filed on Apr. 8, 2005, the entire disclosure of which is incorporated herein by reference in its entirety.

BACKGROUND OF THE INVENTION

1. Field of the Invention

The present invention relates to a data outputting apparatus which can be applied to an image forming apparatus, etc., having a box function capable of storing information such as image data in a sorted manner, and also relates to data outputting control program.

2. Description of the Related Art

The following description sets forth the inventor's knowledge of related art and problems therein and should not be construed as an admission of knowledge in the prior art.

A recently available image forming apparatus, one of data outputting apparatuses, has a function of once storing electronic data in a storing device such as a hard disk and then printing out the data at the timing specified by a user as well as a function of immediately printing out received print data or facsimile data.

Furthermore, in another image forming apparatus, the electronic data can be stored in a divided storing area called "box" every user or every group.

In order to promote effective use of the box of the aforementioned image forming apparatus, various proposals have been made or have been already brought into practice.

For example, for the purpose of convenience for the case in which conference materials are prepared by a plurality of persons and a person in charge handles the materials at one location, it has been proposed to store electronic data of the materials created by each person in a predetermined box and print them at the same time.

Furthermore, another proposal has been made. In this proposal, a print start time is set to respective boxes so that the data stored in each box can be outputted when the print start time has come.

Japanese Unexamined Laid-open Patent Publication No. 2002-218120 discloses a facsimile apparatus in which a time for outputting facsimile data received at night can be arbitrarily set so that the facsimile data can be printed out by the set time.

However, in the case of the aforementioned proposal in which materials prepared by respective persons are gathered and printed at one location, it is required for a person in charge to watch whether all of the data have been stored in the box and execute the print operation when all of the data are gathered, which was inconvenient.

Furthermore, even if the technique disclosed by the aforementioned patent document is referred, in the technique, data will be automatically printed out at the set time even if all of the data has not been gathered in the box. Accordingly, the technique could not solve the aforementioned inconvenience experienced in the case of gathering all of data in a single box to print them.

In the aforementioned proposal in which a print start time is set to respective boxes so that the data stored in the boxes can be outputted at the print start time, there also was a problem mentioned below. That is, before the completion of an earlier initiated print operation of all of the data stored in a box, if it gets to the print start time for another box, the later initiated print operation cannot be executed until the completion of the earlier initiated print operation even if the data stored in another box is urgent and important. The aforementioned patent publication fails to disclose any solution of this problem.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a data outputting apparatus, such as an image forming apparatus, having a box function enhanced in convenience for the case of storing plural data in a box and then outputting them.

Among other potential advantages, some embodiments can provide a data outputting apparatus, such as an image forming apparatus, having a box function enhanced in convenience for the case of setting an output initiation time to each of a plurality of boxes.

Among other potential advantages, some embodiments can provide a recording medium in which data output control program for making a computer execute data output control processing for the aforementioned data outputting apparatus is recorded.

According to a first aspect of the preferred embodiment of the present invention, a data outputting apparatus, comprising:

a box capable of storing data in a sorted manner;

an outputting portion for outputting the data stored in the box;

a data number setting portion for setting the number of data to be stored in the box; and a controller for making the outputting portion output the data stored in the box when the number of data stored in the box has reached the set number of data.

According to a second aspect of the preferred embodiment of the present invention, a data outputting apparatus, comprising:

first and second boxes each capable of storing data in a sorted manner; an outputting portion for outputting the data stored in the first and second boxes;

an output time setting portion capable of setting an output initiation time of the data stored in each of the boxes to each of the boxes;

a priority setting portion for setting priority to each of the boxes;

an output completion time calculating portion for calculating an output completion time in the case of outputting data stored in the first box to which it gets to the output initiation time by the outputting portion;

a comparing portion for comparing the calculated output completion time for the first box and the output initiation time for the second box and comparing priority of the first box and that of the second box when it gets to the output initiation time for the second box before the output completion time for the first box; and a controller for controlling the outputting portion so as to give priority to outputting for one of the boxes with higher priority as a result of the comparison.

According to a third aspect of the preferred embodiment of the present invention, a recording medium in which data output control program for making a computer execute steps is recorded, the steps comprising:

a step of storing a plurality of data in a box capable of storing the data in a sorted manner; and a control step for outputting the data stored in the box when the number of data stored in the box has reached a previously set number of data.

According to a fourth aspect of the preferred embodiment of the present invention, a recording medium in which data output control program for making a computer execute steps is recorded, the steps comprising:

a step of calculating an output completion time in the case of outputting data stored in a first box to which it gets to a previously set output initiation time, the first box being capable of storing data in a sorted manner;

a step of comparing the calculated output completion time for the first box and a previously set output initiation time for a second box, and also comparing previously set priority of the first box and that of the second box when it gets to the output initiation time for the second box before the output completion time for the first box; and a control step for performing control so that priority is given to outputting for a box with higher priority as a result of the comparison.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
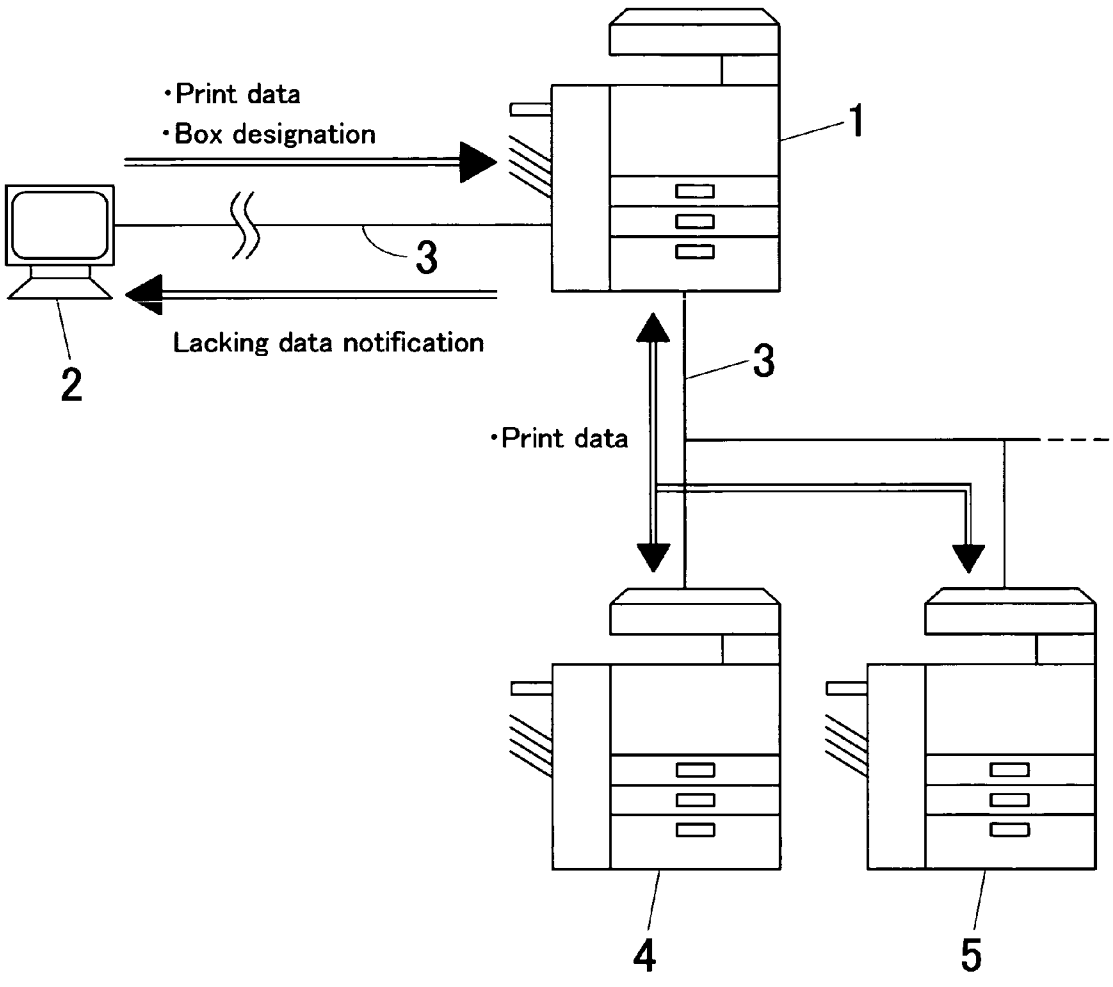
FIG. 1 is an explanatory structural view showing an image forming system using an image forming apparatus which is a data outputting apparatus according to an embodiment of the present invention.

FIG. 1 is a structural explanatory view showing an image forming system using an image forming apparatus which is a data outputting apparatus according to an embodiment of the present invention.

This system is constituted by an image forming apparatus 1 as a data outputting apparatus and a terminal apparatus 2. The image forming apparatus 1 and the terminal apparatus 2 are connected with each other via a network 3.

The network 3 can be any one of networks including a network using dedicated lines such as an LAN (Local Area Network), a network using public lines and a wireless network.

The image forming apparatus 1 is a MFP (Multi Function Peripherals) for forming a scanned original document image and a copied image of an image created from print data transmitted from the terminal apparatus 2 on a paper.

The image forming apparatus 1 is, in this embodiment, connected to another image forming apparatuses 4 and 5 such as MFPs and printers via the network 3.

The terminal apparatus 2 is a normal computer equipped with a CPU, a RAM, a fixed storage, a monitor, a keyboard, a mouse, etc. The terminal apparatus 2 transmits various requests, such as a print request or a data storing request, to the image forming apparatus 1 based on user's instructions.

Figure 2:
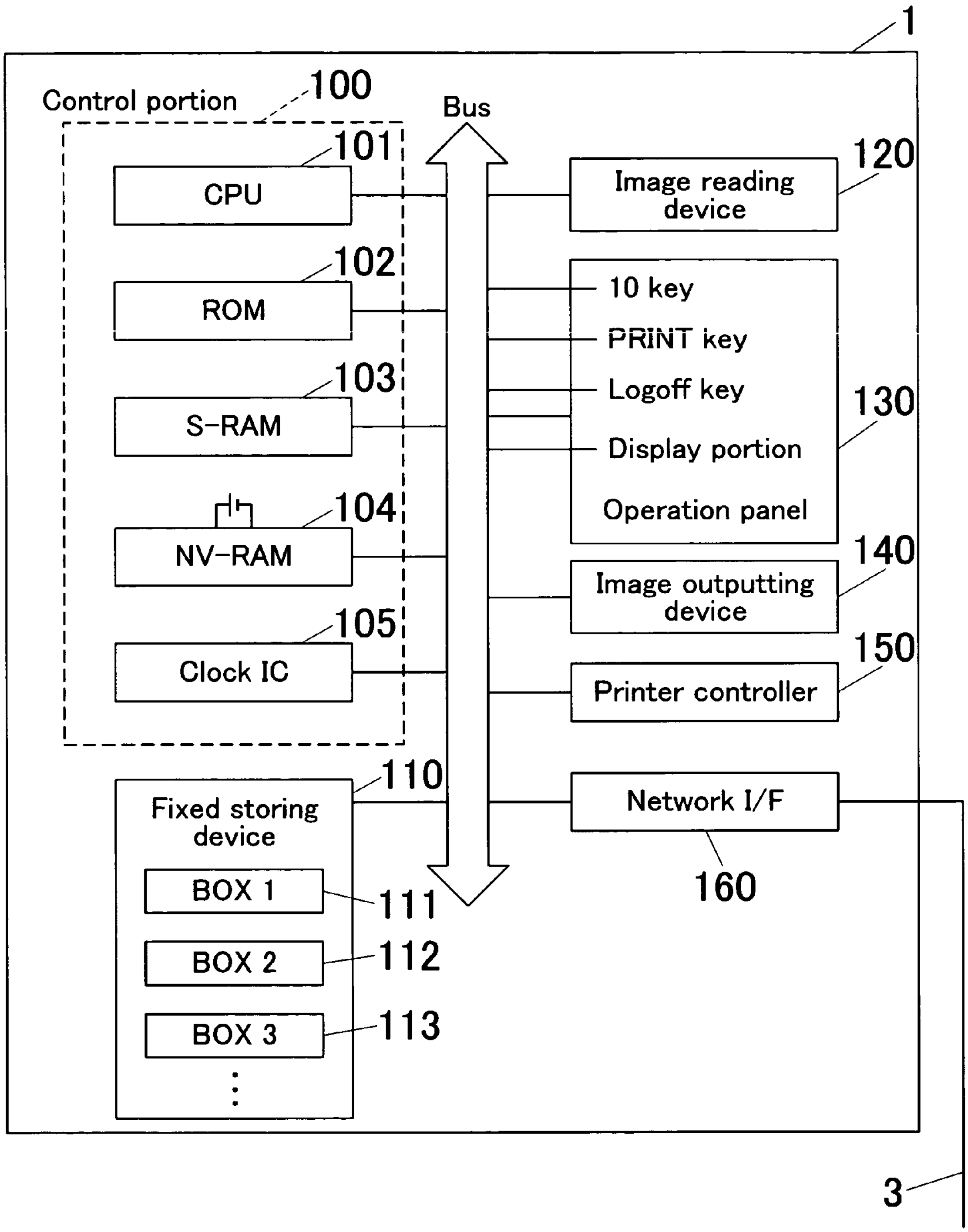
FIG. 2 shows an internal structure of the image forming apparatus used in the system shown in FIG. 1.

FIG. 2 shows the internal structure of the image forming apparatus 1.

To the CPU 101 of the image forming apparatus 1, a ROM 102 in which control program including output control program is stored, a working S-RAM (Static Random Access Memory) 103, a battery-backup NV-RAM 104 (nonvolatile memory) for storing various settings regarding image forming, and a clock IC 105 having a calendar function are connected via a bus. These components constitute a controller 100.

To the controller 100, an image reading device 120 for reading an original document, an operation panel 130 equipped with keys for performing various input operations and a display portion, a network interface 160 (hereinafter referred to as "network I/F") for exchanging various information among external apparatuses such as the image forming apparatuses 4 and 5 and the terminal apparatus 2 connected via the network 3, a printer controller 150 for creating a copied image from the print data received via the network I/F 160, and an image outputting device (printing device) 140 for forming a copied image on a paper, are connected via the bus.

To the controller 100, a fixed storing device 110 is connected via the bus. An example of the fixed storing device 110 is a hard disk device.

The fixed storing device 110 is provided with "boxes" 111, 112, 113 . . . , which are divided storing areas, and is capable of storing an original document image read by the image reading device 120, a copied image created from the print data transmitted from the terminal apparatus 2 and/or various information in the boxes as electronic data. The electronic data stored in the boxes can be printed out or transmitted to the terminal apparatus 2 via the network I/F 160.

The boxes 111, 112, 113 . . . can be classified into two types, i.e., a "public box" which does not limit an access to the electronic data stored therein and a "private box" which only allows an access to the electronic data by a specific user or user group. The private box is constituted so as to limit an access with a password for example. By allotting a password to a certain user or group, only the user or group is allowed to access the documents stored in the box.

The fixed storing device 110 can have one or more public boxes and one or more private boxes. Each box can be uniquely identified by a box number. In place of the box number, a box name can be used so that a user can easily identify the box.

Both in the public box and the private box, each box can store one or more documents. To identify a document to be stored in one of the boxes, a document number uniquely allotted over the boxes is given to the document. Like the box number, the document number can be replaced with a document name.

The boxes 111, 112, 113 . . . are created through operations at the operation panel 130. At this time, a box number, a box name and a box type (i.e., public box or private box) are inputted via the operation panel 130 and then stored in the fixed storing device 110. In the case of a private box, a password is further inputted and stored in the fixed storing device 110. Furthermore, the boxes can be deleted by the operation at the operation panel 130.

Next, the entire process flow between the terminal apparatus 2 and the image forming apparatus 1 will be explained with reference to FIGS. 1 and 3.

A user sets the print initiation condition to one or a plurality of boxes using the operation panel 130 of the image forming apparatus 1 or using the terminal apparatus 2. In this embodiment, the condition can be set based on the number of data to be stored in the box or can be set based on the number of data every user. Furthermore, a print initiation time can also be set. In addition to the setting of the print initiation condition, the user can also set a print mode every box. The set print initiation condition and print mode are received by the CPU 101 of the image forming apparatus 1 to be effective.

Figures 3A, 3B:
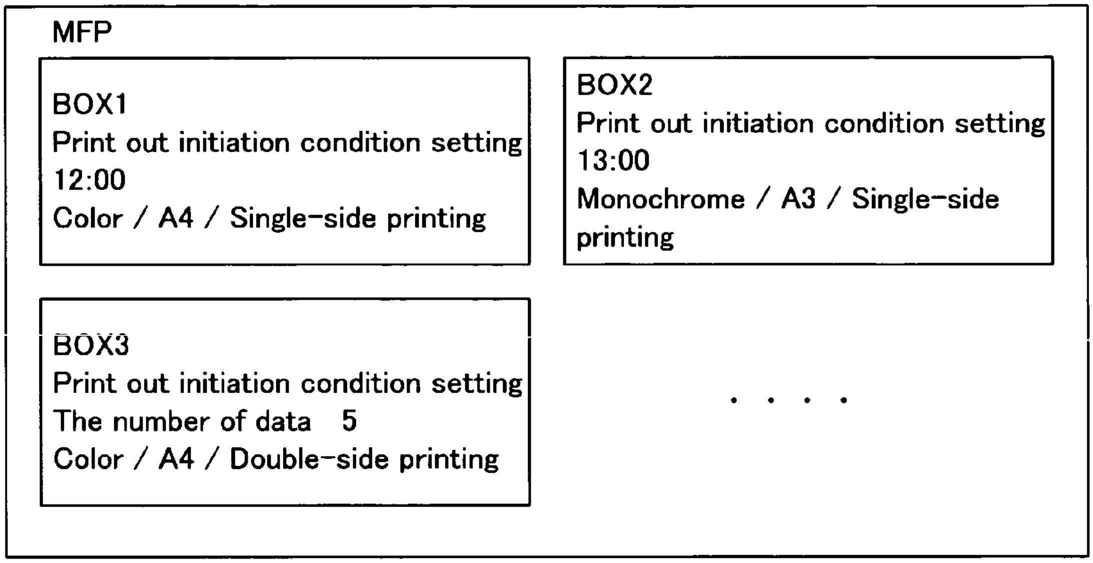
FIG. 3A is a schematic view for use in the explanation of print start initialization conditions of the boxes.
FIG. 3B shows an example of a set information administration table.

FIG. 3A shows one example of a print initiation condition and a print mode set to each box. In this example, in the box (shown as "BOX" in the figure) 1, the print initiation time (12:00) is set as a print initiation condition, and "color printing/A4 size/single-side printing" is set as a print mode. In the BOX 2, the print initiation time (13:00) is set as a print initiation condition, and "monochrome printing/A3 size/single-side printing" is set as a print mode. In the BOX 3, the number of data (5 data) is set as a print initiation condition, and "color printing/A4 size/double-side printing" is set as a print mode.

The set contents are stored in the fixed storing device 110 as a set information administration table shown in FIG. 3B. The CPU 101 executes print control processing based on the set contents with reference to this set information administration table.

With the print initiation conditions and printing modes set as mentioned above, as shown in FIG. 1, when a user transmits print data from the terminal 2 to the image forming apparatus 1 by specifying a certain box, the transmitted print data is stored in the specified box in the image forming apparatus 1.

In cases where a print initiation time is set as a print initiation condition, when it gets to the set print initiation time, the data stored in the box will be printed at the set print mode.

In cases where the number of data to be stored is set as a print initiation condition, when the number of data stored in the box has reached the set number, the data will be printed at the set print mode. In this case, if a print initiation time is also set, when it gets to the print initiation time, the data will be printed even if the number of stored data has not yet reached the set number.

In cases where the number of data to be stored is set as a print initiation condition every user, when the number of data stored in the user's box has reached the set number, the data will be printed. In this case, if a print initiation time is also set, although the data will be printed even if the number of stored data has not reached the set number when it gets to the set print initiation time, it can be set to notify a user whose data is lacking or all of the set users that data is lacking before printing.

Furthermore, in cases where a print initiation time is set to each of a plurality of boxes as a print initiation condition, when it gets to the print initiation time, the data in each box will be printed. In this case, if it gets to the print initiation time set for one of the boxes and thereafter it gets to another print initiation time set for another box before the data print completion time of the one of the boxes, appropriate print adjustments, e.g., transmitting the print data to another image forming apparatus 4 or 5, can be performed.

Hereinafter, print control processing to be executed when the data stored in the box to which print initiation conditions are set is printed will be explained concretely.

1) First Embodiment

In this embodiment, the number of data to be stored in a box is set as a print initiation condition, and a print initiation time is further set.

Figure 4A:
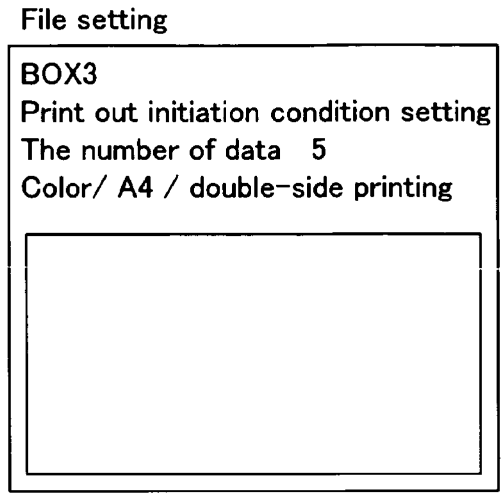
FIG. 4 is an explanatory view of print control processing according to a first embodiment of the present invention.
Figure 4B:
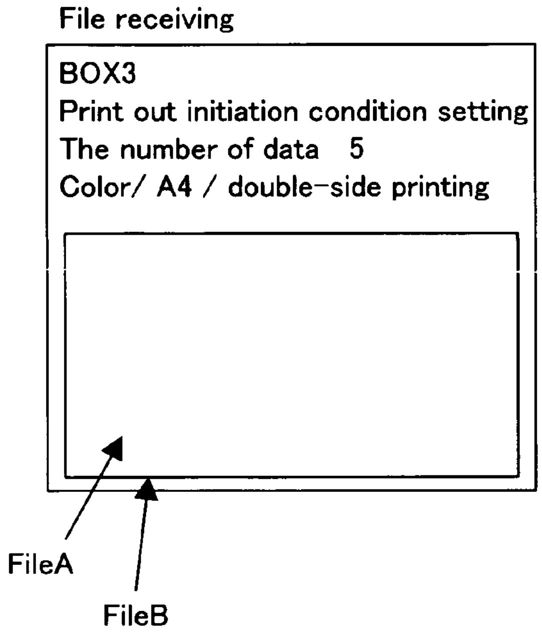
Figure 4C:
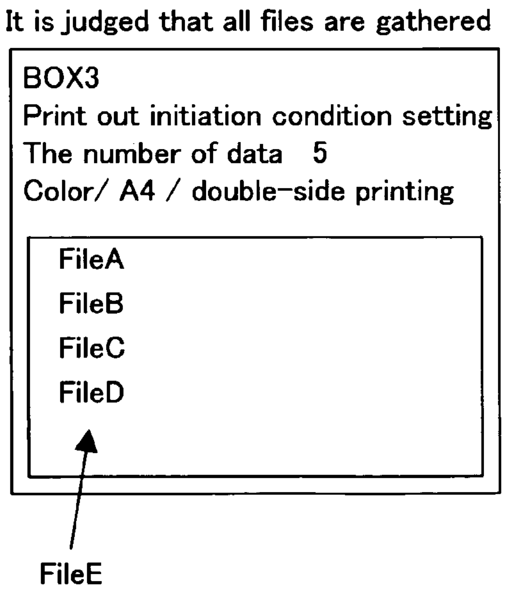
Figure 4D:
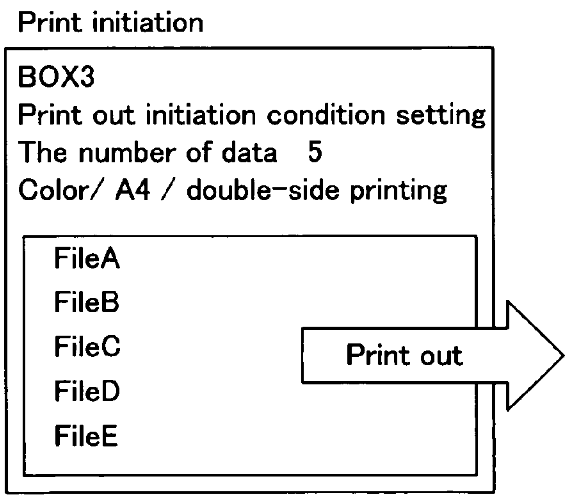

It is assumed that as a print initiation condition "the number of data: 5" is set to BOX 3 as shown in FIG. 4A. Print data are transmitted by a user to the BOX 3 via the terminal apparatus 2 and then stored in the BOX 3 (see FIG. 4B). When the number of print data has reached "the number of data: 5" which is the set print initiation condition (see FIG. 4C), printing of all of the data stored in the BOX 3 is initiated (FIG. 4D).

Furthermore, in cases where the number of data and a print initiation time are set, when it gets to the set print initiation time before the number of print data reaches the set number, the data stored in the box will be automatically printed at the time.

Control to be executed by the CPU 101 in this embodiment will be explained with reference to the flowcharts shown in FIGS. 5 to 8. This control is executed by the CPU 101 in accordance with the control program stored in the ROM 102, etc.

Figure 5:
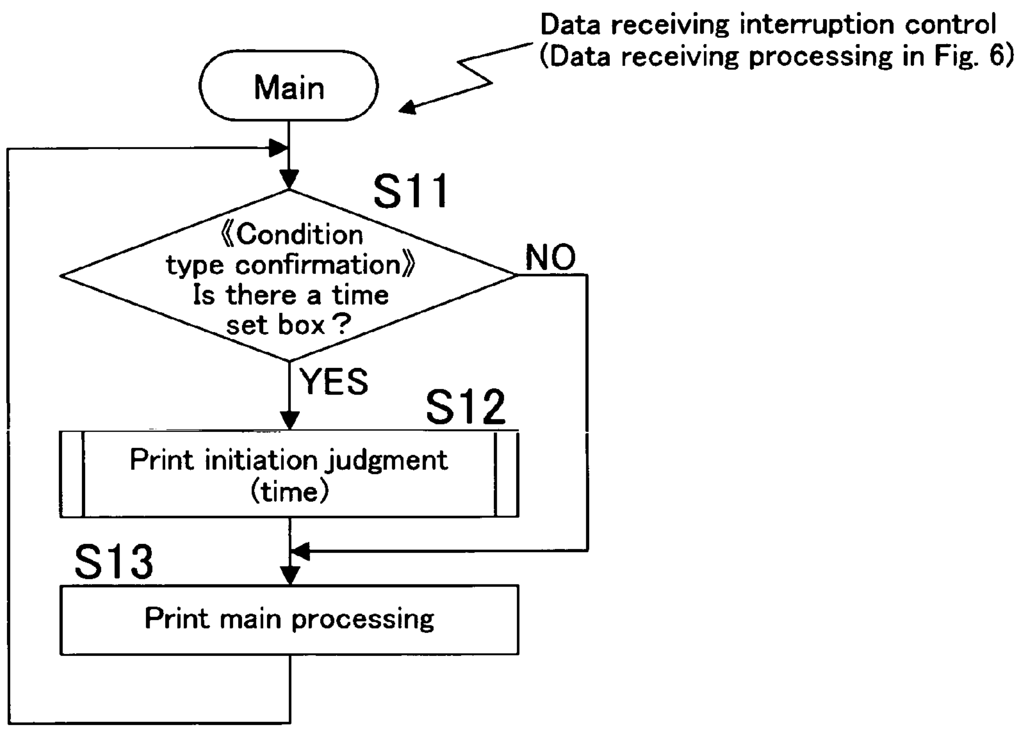
FIG. 5 is a main flowchart showing the print control processing according to the first embodiment of the present invention.

FIG. 5 is a flowchart showing a main routine. At Step S11 in FIG. 5, the CPU 101 confirms the set conditions in the set information administration table in FIG. 3B stored in the fixed storing device 110 and discriminates whether there is a box to which a print initiation time is set as a print initiation condition. If there is no box to which a print initiation time is set (NO at Step S11), the routine proceeds to Step S13.

If there is a box to which a print initiation start time is set (YES at Step S11), print initiation judgment processing is executed based on the print initiation time at Step S12, and then the routine proceeds to Step S13.

At Step S13, the print main processing is executed to have the image outputting device 140 print the data to be printed, and then the routine returns to Step S11.

Figure 6:
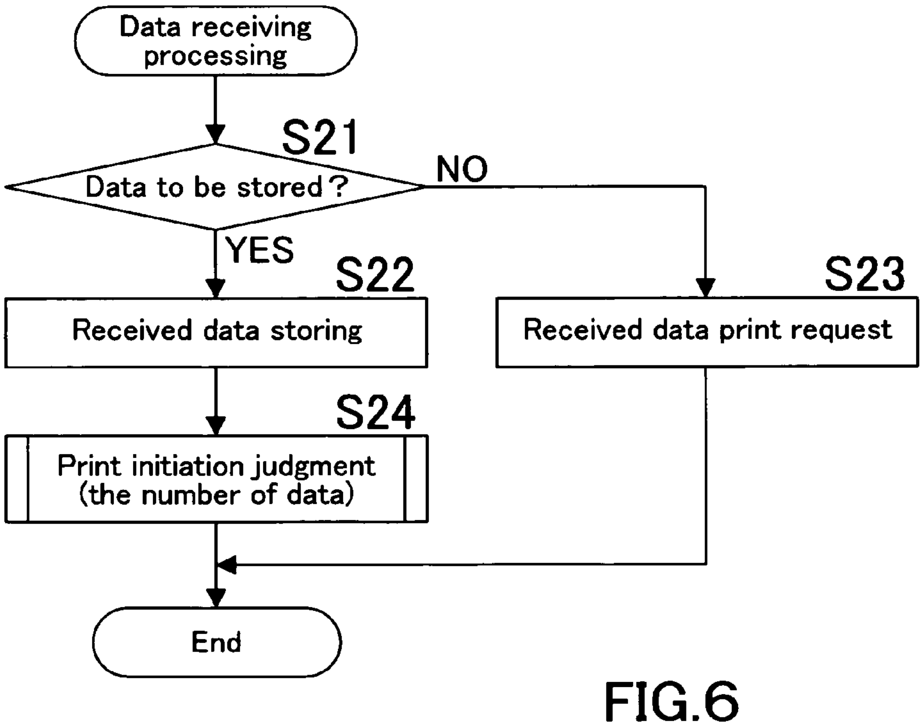
FIG. 6 is a flowchart showing the interrupt control processing to be executed at the time of receiving data in the middle of the processing in the main flow chart shown in FIG. 1.

If there is a data receiving interruption during the main routine control, the data receiving processing shown in FIG. 6 is executed. In FIG. 6, at Step S21, it is discriminated whether the received data is data to be stored in a box. If it is not a data to be stored (NO at Step S21), it is discriminated to be a normal print, and a print request of the received data is issued at Step S23. Then, the interrupt processing terminates. This print request is judged during the print main processing at Step S13 shown in the main flowchart in FIG. 5, and the print is executed.

On the other hand, if the received data is data to be stored (YES at Step S21), the received data is stored in the specified box at Step S22, then the routine proceeds to Step S24. At Step S24, print initiation judgment processing based on the number of data is executed, and then the interruption processing terminates.

Figure 7:
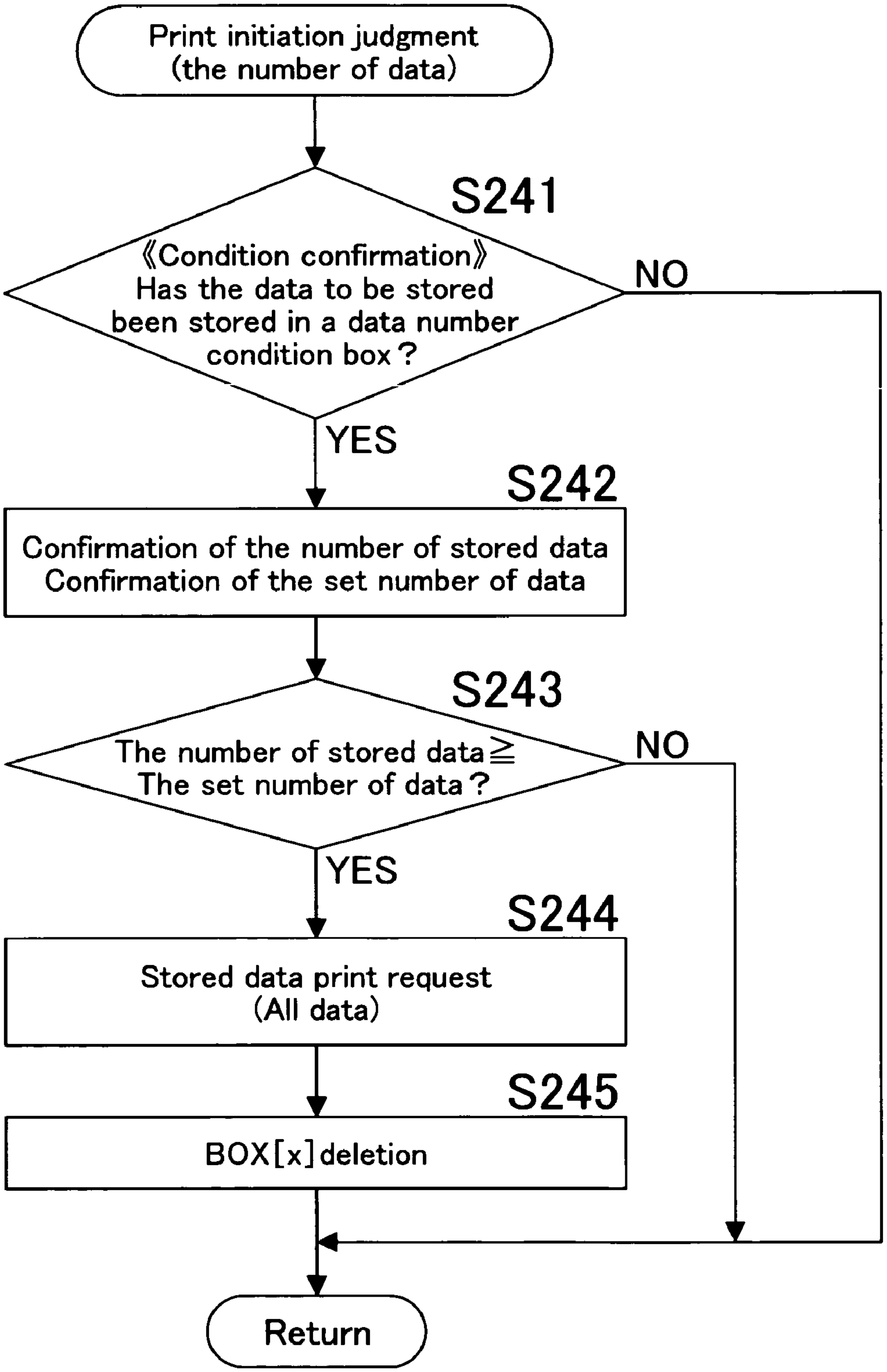
FIG. 7 is a flowchart showing the print initiation judgment processing at Step S24 shown in FIG. 6.

FIG. 7 shows a subroutine of the print initiation judgment processing at Step S24.

At Step S214, it is discriminated whether the received data has been stored in a box in which the number of data is set as a print initiation condition. If it is discriminated that it has not been stored in the box (NO at Step S241), the routine returns.

If it has been stored (YES at S241), the number of data stored in the box and the set number of data are confirmed at S242. Thereafter, at Step S243, the number of stored data and the set number of data are compared and if the print initiation condition is satisfied, or the number of stored data is the same as or larger than the set number of data (YES at S243), a print request of all of the stored data is issued at Step S244. This print request is judged during the print main processing at Step S13 in the main flowchart in FIG. 5, and the printing is executed.

Next, the box is deleted at Step S245, and the routine returns.

At Step S243, if the number of stored data is less than the set number of data (NO at Step S243), the routine returns because the print initiation condition is not met.

As explained above, all of the stored data will be printed when the number of data stored in a prescribed box reaches the set number. Accordingly, for example, in cases where meeting materials are prepared by a plurality of persons, if it is set to store each data prepared by each person in a prescribed box, the materials will be automatically printed when all of the data are gathered from each person. This eliminates the need that a person in charge routinely checks whether all of the data are gathered and the need that a print operation is executed when all of the date are gathered, resulting in convenient system.

Figure 8:
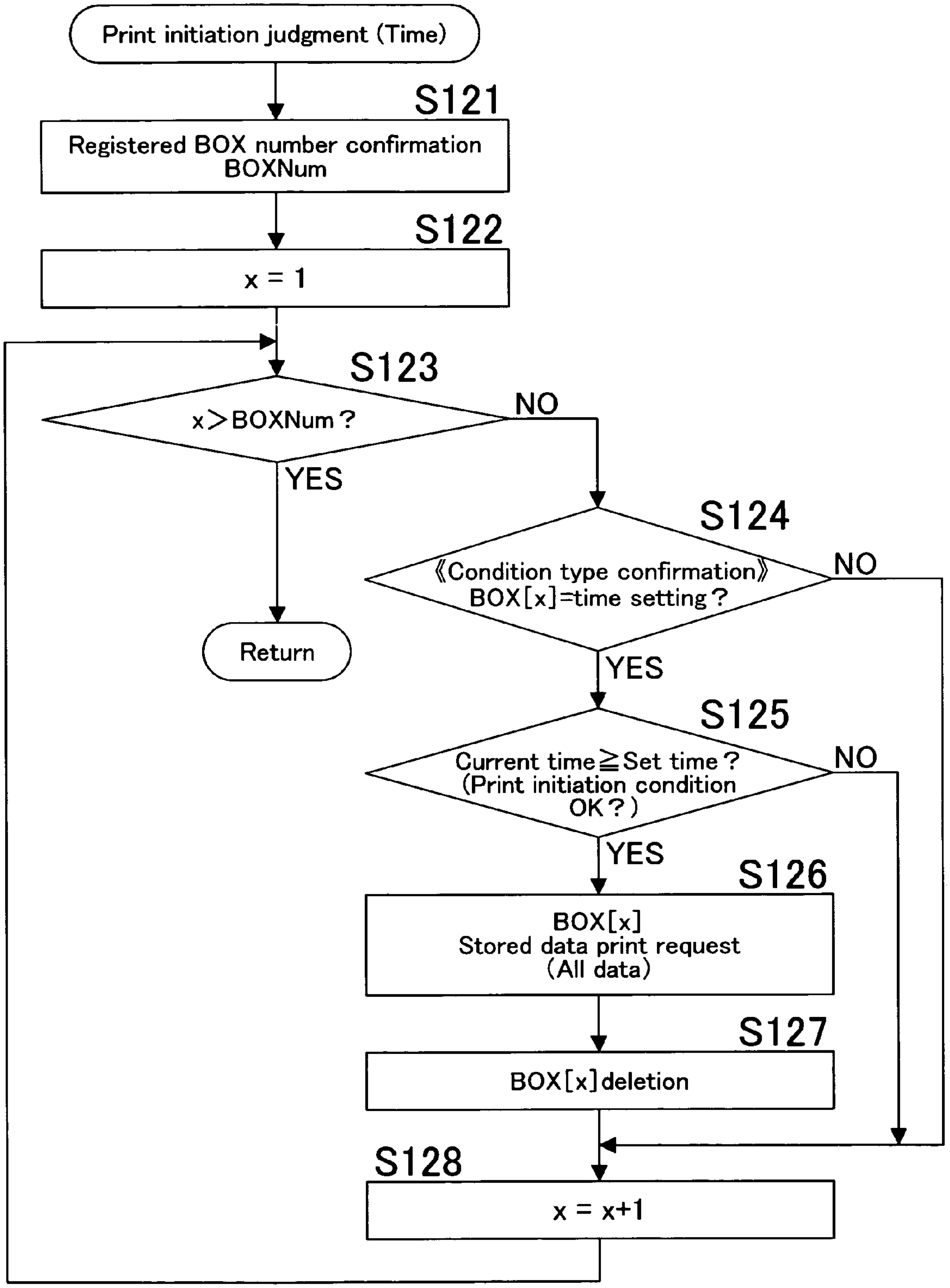
FIG. 8 is a flowchart showing the print initiation judgment processing at Step S12 shown in FIG. 5.

FIG. 8 is a flowchart showing the subroutine of the print initiation judgment processing based on a time setting at Step 12 in the flowchart in FIG. 5.

The CPU 101 confirms the number of registered boxes "BoxNum" at Step S121, initializes the variable x of the box number at Step S122, and then executes the following processing with respect to all of the boxes. That is, after confirming that x is smaller than the number of registered boxes (NO at Step S123), it is initially confirmed at Step S124 whether a print initiation time is set as a print initiation condition of the box x. If no print initiation time is set (NO at Step S124), the variable x of the box number is incremented at Step S128, and the same step will be performed for the next box. If a print initiation time is set (YES at Step S124), the routine proceeds to Step S125 to discriminate whether the condition is met (whether the current time has got to the set time) by comparing the current time and the set time.

If the condition is not met (NO at Step S125), the routine proceeds to Step S128 to perform the confirmation of Step S124 with respect to the next box. If the condition is met (YES at Step S125), a print request for all of the data stored in the box will be issued at Step S126. This print request is judged during the print main processing of Step S13 in the main flowchart in FIG. 5, and the print is executed.

Next, after deleting the box at Step S127, the variable x of the box number is incremented at Step S128, and the same processing is repeated for the next box.

As mentioned above, it is confirmed whether a print initiation condition is met with respect to all of the respective registered boxes. If met, a print request of the data of the box is made and the box is deleted.

Upon completion of the aforementioned confirmation on all of the boxes (YES at Step S123), the routine returns.

As will be understood from the above, as for the box to which a print initiation time is set as a print initiation condition, when it gets to the print initiation time even if the number of data has not yet reached the set number, the data in the box will be automatically printed. In other words, it becomes possible to set the deadline for gathering data to each box, which eliminates the need for the long waiting for the completion of data gathering.

2) Second Embodiment

In this embodiment, as print initiation conditions, a user name and the number of data to be printed are set. Furthermore, a time to forcibly initiate a printing operation even if the number of data has not reached the set number is also set, so that it becomes possible before the set print initiation time to notify that the number of data has not reached the set number.

Figure 9A:
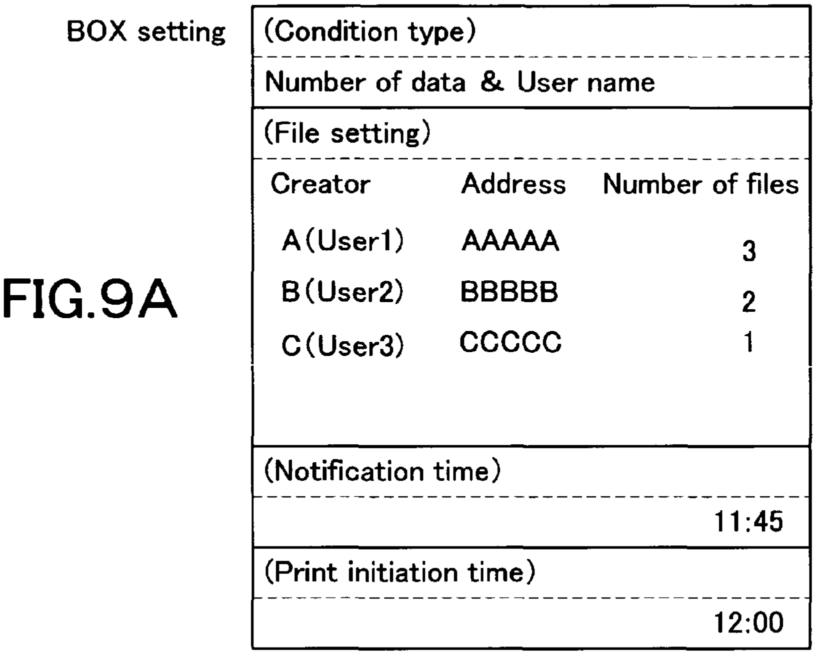
FIG. 9 is an explanatory view of print control processing according to a second embodiment of the present invention.

FIG. 9A shows set contents of print initiation conditions for a certain box. In this example, with respect to the user (creator) A, the user (creator) B and the user (creator) C, the number of data (files), 3, 2 and 1, are set respectively. The print initiation time is set to 12:00, and the notification time for the case where all of the data are not gathered is set to 11:45. Furthermore, notification addresses of the creators A to C are also inputted in advance.

Figure 9B:
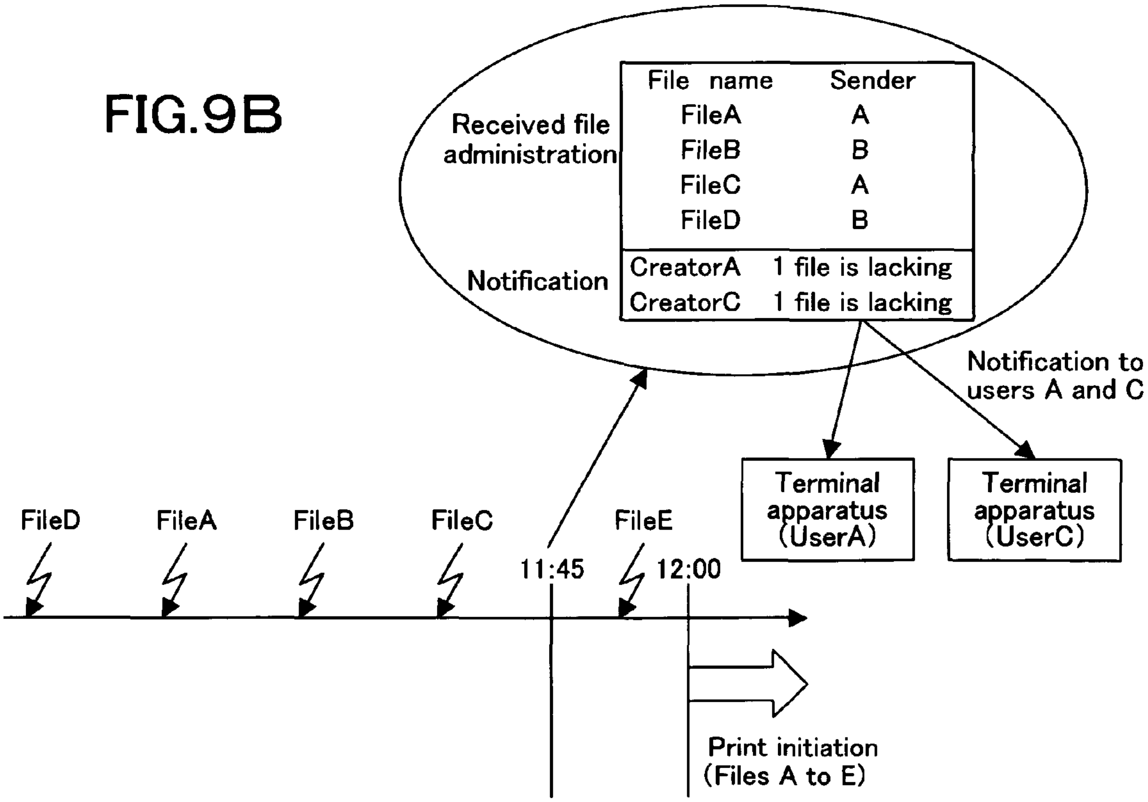

As shown in FIG. 9B, it is assumed that the data (files) A and C transmitted from the user A and the data (files) B and D transmitted from the user B are stored in the box by the notification set time of 11:45. In this case, these data (files) are administrated by the received file administration table, and it is understood that one file to be transmitted from the user A and one file to be transmitted from the user C are still lacking at the notification time of 11:45.

Accordingly, the lacking of data will be notified to the user A and user C at the notification time, 11:45. This notification can be made to all of the users including the user B. This notification enables the user A or the user C to transmit the lacking data (file) to store the data (file) in the box by the print initiation time.

The control to be executed by the CPU 101 in this embodiment will be explained with reference to the flowcharts shown in FIGS. 10 to 13. This control is executed by the operation of the CPU 101 in accordance with the control program stored in the ROM 102, etc.

Figure 10:
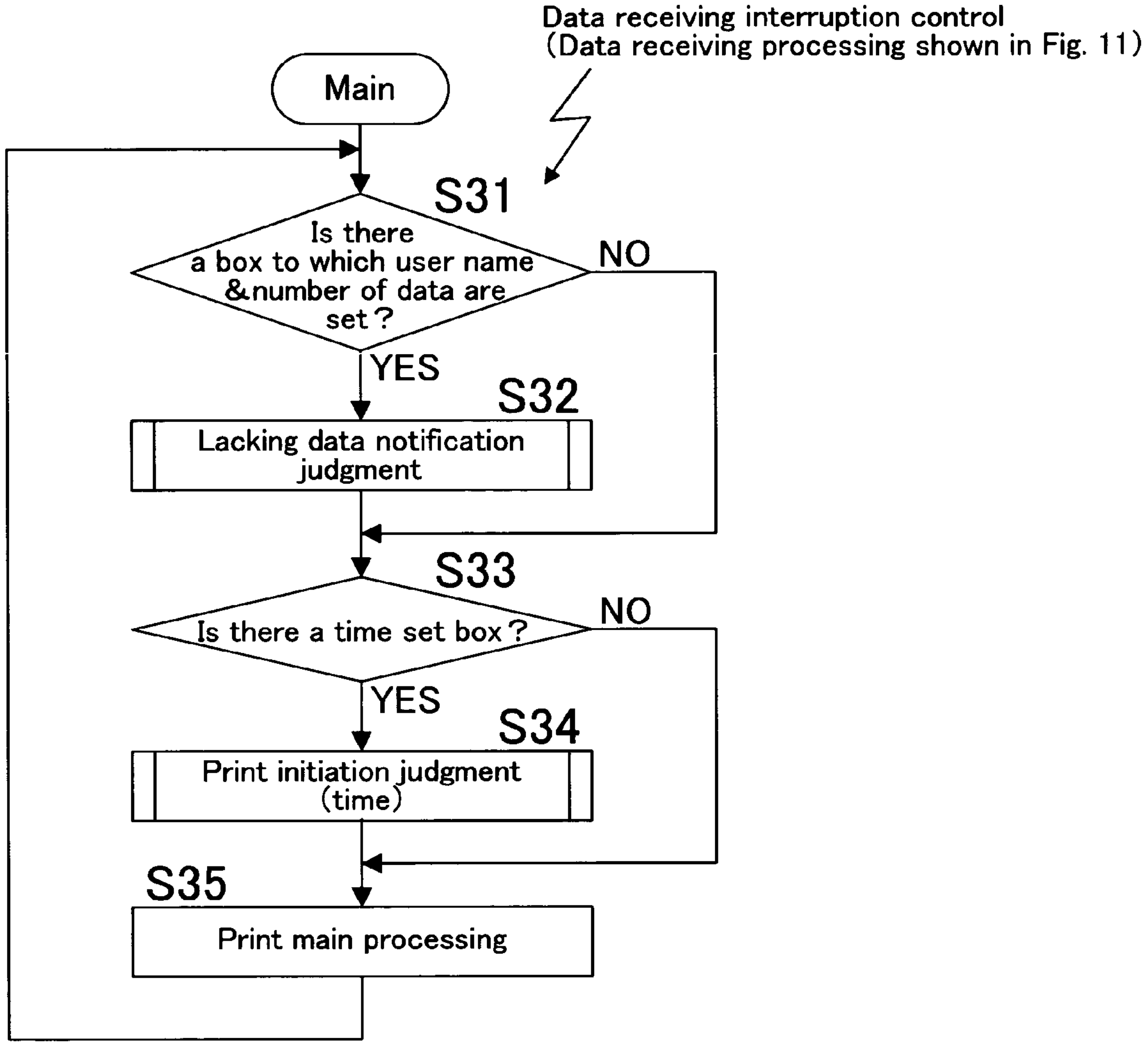
FIG. 10 is a main flowchart showing the print control processing according to the second embodiment of the present invention.

FIG. 10 is a flowchart showing the main routine. At Step S31 in FIG. 10, the CPU 101 confirms the set conditions in the set information administration table shown in FIG. 3B stored in the fixed storing device 110, and discriminates whether there is a box to which a user name and the number of data to be printed are set as print initiation conditions. If there is no box to which a user name and the number of data to be printed are set (NO at Step S31), the routine proceeds to Step S33.

If there is a box to which a user name and the number of data to be printed are set (YES at Step S31), the CPU 101 executes the lacking data notification judgment processing at Step S32, and then the routine proceeds to Step S33.

At Step S33, it is discriminated whether there is a box to which a print initiation time is set as a print initiation condition.

If there is a box to which a print initiation time is set (YES at Step S33), the print initiation judging processing based on the print initiation time is executed at Step S34, and then the routine proceeds to Step S35. If there is no box to which a print initiation time is set (NO at Step S33), the routine proceeds to Step S35.

At Step s35, print main processing is executed to make the image outputting device 140 print the data to be printed, and then the routine returns to Step S31.

Figure 11:
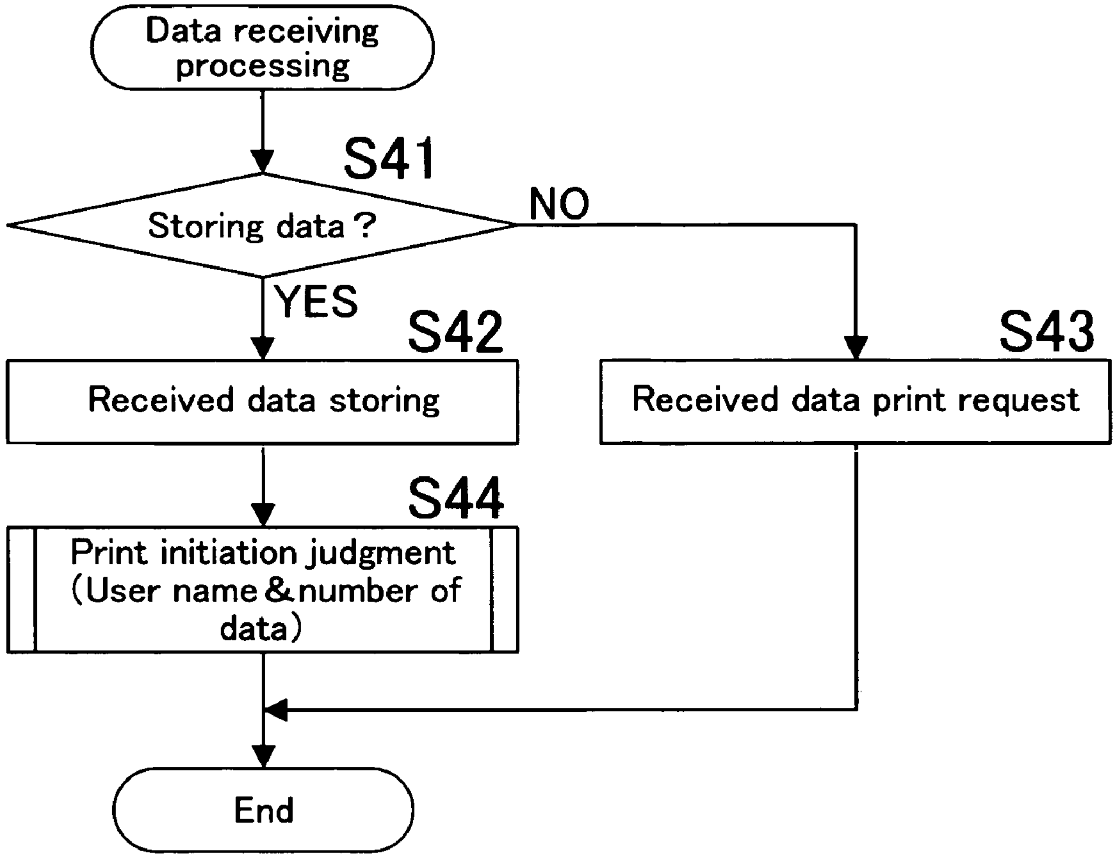
FIG. 11 is a flowchart showing the interrupt control processing to be executed at the time of receiving data in the middle of the processing in the main flow chart shown in FIG. 10.

If there is a data receiving interruption during the main routine control, the data receiving processing shown in FIG. 11 is executed. In FIG. 11, it is discriminated at Step S41 whether the received data is data to be stored in a box. If the received data is not data to be stored (NO at Step S41), it is discriminated as a normal print and a print request of the received data is issued at Step S43, then this interruption processing terminates. This print request is judged during the print main processing of Step S35 in the main flowchart shown in FIG. 10, and the printing is executed.

On the other hand, if the received data is data to be stored (YES at Step 541), the received data is stored in a specified box at Step 542, and then the routine proceeds to Step S44. At Step S44, print initiation judgment processing based on a user name and the number of data to be printed is executed, and then the interruption processing terminates.

Figure 12:
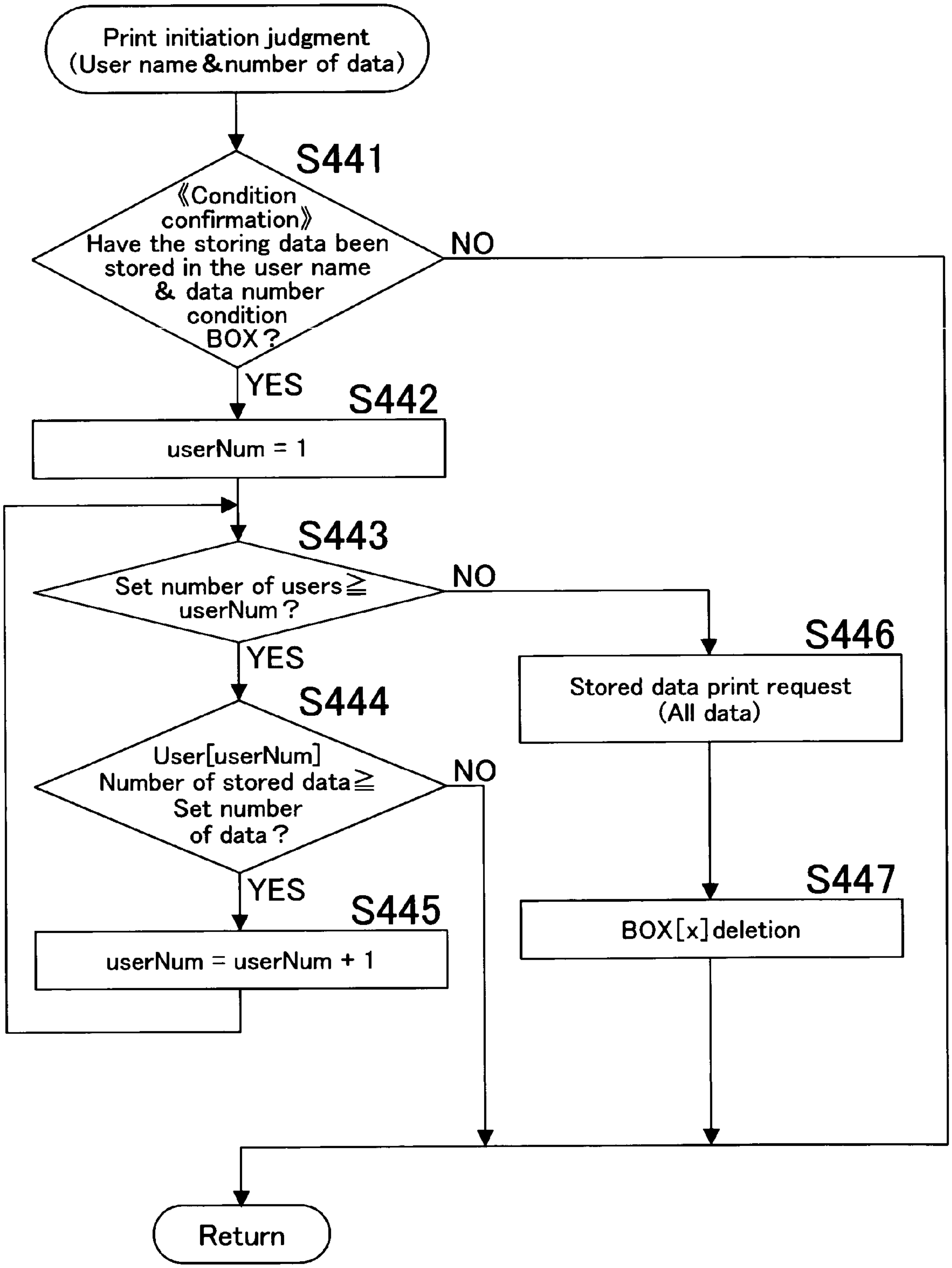
FIG. 12 is a flowchart showing the print initiation judgment processing at Step S44 shown in FIG. 11.

FIG. 12 shows a subroutine of the print initiation judgment processing of Step S44.

At Step S441, it is discriminated whether data has been stored in the box to which a user name and the number of data to be printed are set as print initiation conditions. If no data has been stored (NO at Step S441), the routine returns.

If the data has been stored (YES at Step S441), the user number "UserNum," which is a variable number, is initialized at Step S442, and it is discriminated whether the number of stored data has reached the set number of data with respect to all of the set users.

That is, at Step S443, it is discriminated whether the user number is the same as or smaller than the set user number, or whether there is any user whose number of data has not been confirmed. If the user number is the same as or smaller than the set user number (YES at Step S443), the number of the user's stored data is compared with the set number of data.

If the number of stored data has reached the set number of data (YES at Step S444), the user number is incremented at Step S445, and then it is discriminated whether the number of the next user's stored data has reached the set number of data.

Thus, it is discriminated whether the number of stored data of each of the users has reached the set number of data. When it is discriminated that the number of stored data of each user has reached the set number of data (NO at Step S443), a print request of all of the stored data is issued at Step S446. This print request is judged during the print main processing of Step S35 in the main flowchart shown in FIG. 10, and the printing is executed.

Next, at Step S447, the box is deleted, and then the routine returns.

If the number of stored data of any one of users has not reached the set number of data (NO at Step S444), the routine returns without issuing a print request.

Thus, when the number of data of each user stored in a prescribed box has reached the set number, the stored data is automatically printed.

Figure 13:
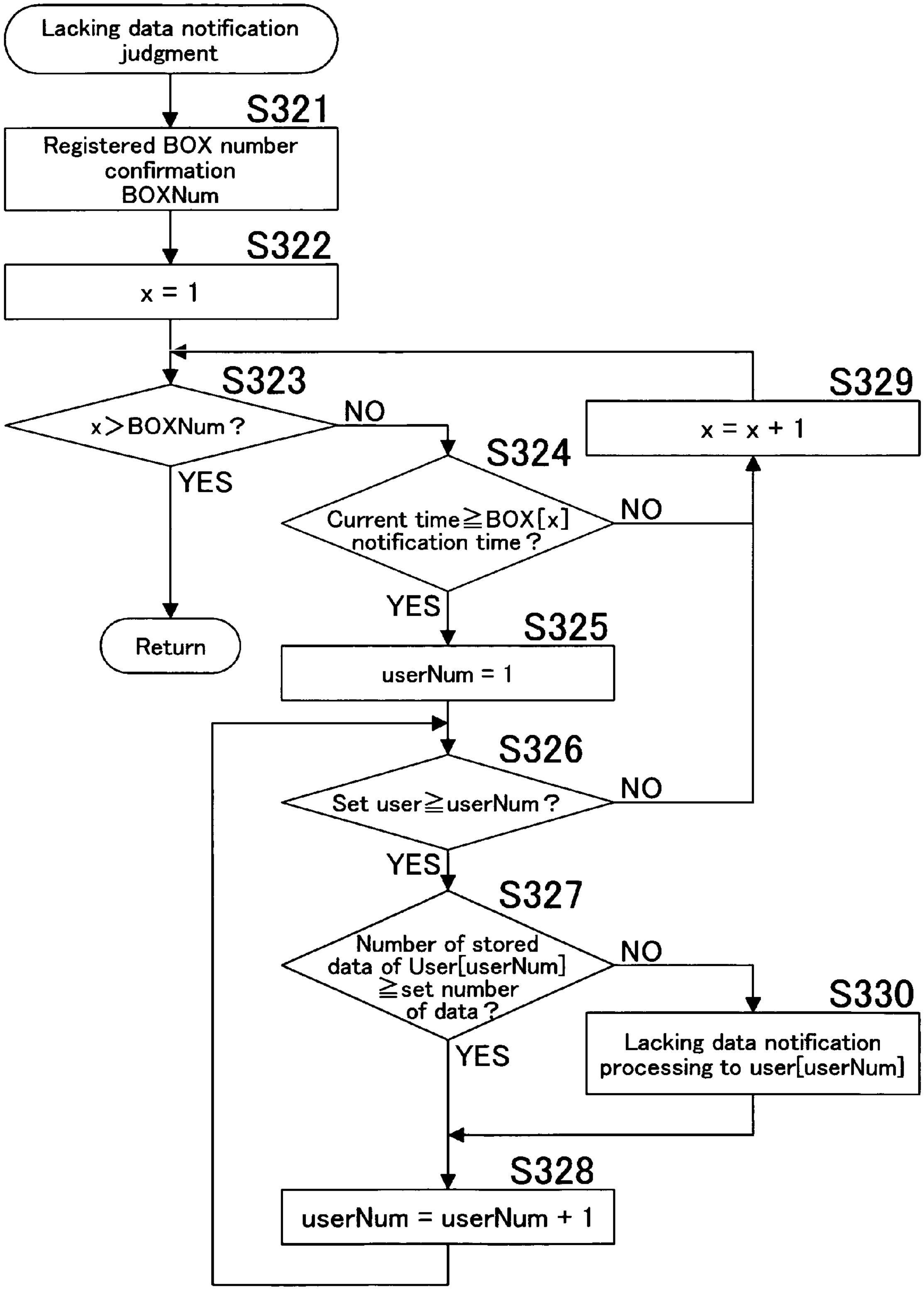
FIG. 13 is a flowchart showing the lacking data notification judgment processing at Step S32 shown in FIG. 10.

FIG. 13 is a flowchart showing the contents of the lacking data notification judgment processing of Step S32 in the flowchart shown in FIG. 10.

The CPU 101 confirms the number of registered boxes (BoxNum) at Step S321, sets the variable number x to 1 at Step S322, and executes the following processing with respect to all of the boxes. That is, at Step S324, it is discriminated whether the condition is met (whether the current time has got to the notification time) by comparing the current time and the notification time set to the box x.

If the condition is not met (NO at Step S324), the box number x is incremented at Step S329, and the confirmation of Step S324 for the next box is performed (YES at Step S324). If the condition is met (YES at Step S324), it is confirmed whether there is data lacking on every user set to the box.

That is, at Step S325, the user number, which is a variable number, is set to 1. Thereafter, at Step S326, it is confirmed whether the user number is the same as or smaller than the set user number, or whether there is any user whose data number is unconfirmed. If the user number is the same as or smaller than the set user number (YES at Step S326), at Step S327, the number of stored data of the user is compared with the set number of data to be printed.

If the number of stored data has not reached the set number of data to be printed (NO at Step S327), the data lacking and the number of lacking data are notified to the address of the user at Step S330 that data is lacking, and then the routine proceeds to Step S328. If the number of stored data has reached the set number of data to be printed (YES at Step S327), the routine proceeds to Step S328.

At Step S328, the user number is incremented, and it is confirmed whether the number of stored data has reached the set number of data with respect to the next user.

Thus, while notifying the user whose data is lacking that the user's data is lacking, the number of stored data of each user is confirmed in turn with respect to the set users.

After the completion of the confirmation on all of the users set to the box (NO at Step S326), at Step S329, the box number x is incremented. Then, with respect to the next box, the aforementioned confirmation processing of the stored data of each user is performed.

After the completion of the confirmation processing for all of the boxes (YES at Step S323), the routine returns.

As mentioned above, in this embodiment, a notification time which is a time for notifying the data lacking is set to a box, and when it gets to the notification time, the data lacking is notified to the address of the user whose data is lacking. This enables the user who received the notification to take measures such as storing the lacking data, which is convenient.

In this embodiment, the notification is made only to the user whose data is lacking. However, the notification can be made to all of the users set to the box if necessary.

The print initiation judgment processing of Step S34 shown in FIG. 10 is the same as the processing shown in FIG. 8, and therefore the explanation will be omitted. By this print initiation judgment processing of Step S34, even if all of the data set to the box has not gathered yet, when it gets to the print initiation time, printing will be forcibly initiated after the data lack notification.

3) Third Embodiment

This embodiment is structured as follows. In addition to the number of data, a print initiation time and a print mode for initiating printing of the data, a timer for extending a print initiation time can be set in a box so that the timer can be reset when data is received and stored in the box during the extended print initiation time period.

Figure 14:
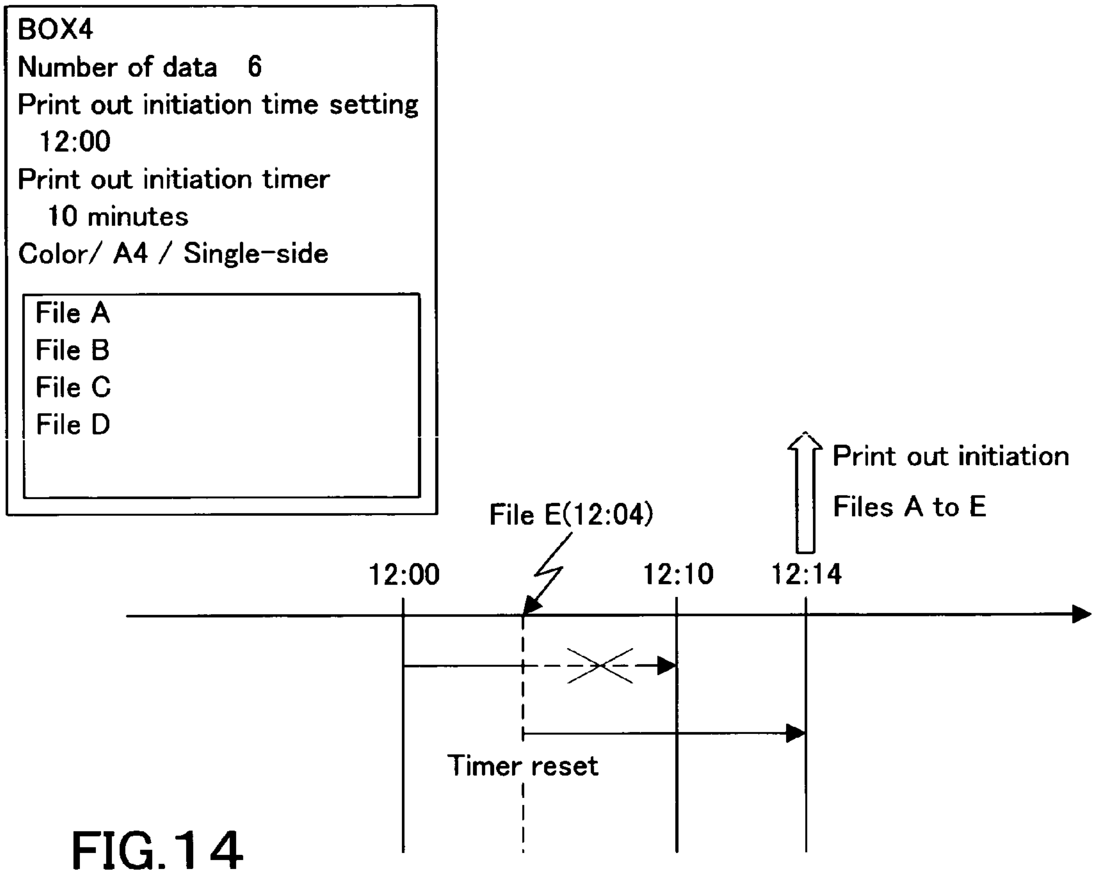
FIG. 14 is an explanatory view of print control processing according to a third embodiment of the present invention.

This embodiment will be explained with reference to FIG. 14. As shown in FIG. 14, set as print initiation conditions in the BOX 4 are a timer ("print out initiation timer" in FIG. 14): 10 minutes as well as various settings including the number of data: 6, the print initiation time: 12:00, and the print mode.

In a state in which four data (files) A to D are stored in the BOX 4 (i.e., in a state in which the number of stored data has not reached the set number of data), when it gets to the print initiation time of 12:00, the timer is set to extend the print initiation time by 10 minutes. By the extended print initiation time, e.g., 12:04, if new data (file) E is stored, the timer is reset to further extend the print initiation time by 10 minutes. Thus, the newly extended print initiation time will be 12:14.

If no new data is stored by this newly extended print initiation time, all of the stored data A to E will be printed at the newly extended print initiation time of 12:14. On the other hand, if new data F is stored by the newly extended print initiation time and the number of stored data has reached six which is the set number of data, all of the data A to F will be printed at that time.

The control to be executed by the CPU 101 in this embodiment will be explained with reference to the flowcharts shown in FIGS. 15 to 18. This control is executed by the operation of the CPU 101 in accordance with the control program stored in the ROM 102, etc.

Figure 15:
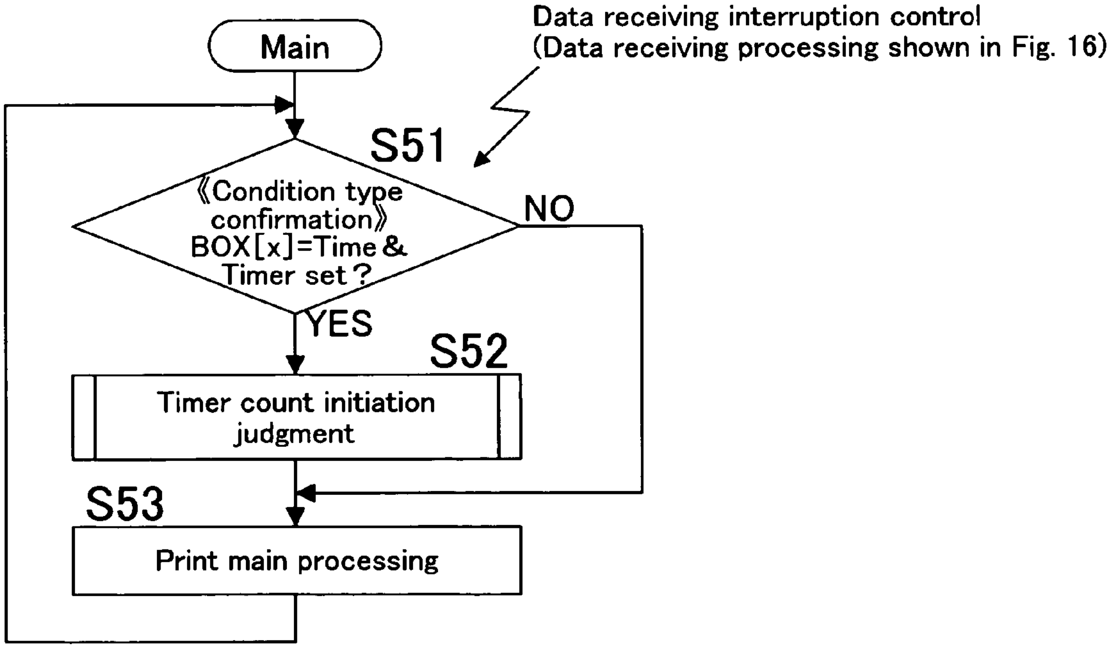
FIG. 15 is a main flowchart showing the print control processing according to the third embodiment of the present invention.

FIG. 15 is a flowchart showing the main routine. At Step S51 in FIG. 15, the CPU 101 confirms the set conditions shown in FIG. 3B and stored in the fixed storing device 110, and discriminates whether there is a box to which a print initiation time as a print initiation condition is set and an extension timer is set. If there is no such a box to which the aforementioned print initiation time and extension timer are set (NO at Step S51), the routine proceeds to Step S53.

If there is a box to which the aforementioned print initiation time and extension timer are set (YES at Step S51), timer count initiation judgment processing is executed at Step S52, and the routine proceeds to Step S53.

At Step S53, print main processing is executed to make the image outputting device 140 print the data to be printed. Then, the routine returns to Step S51.

Figure 16:
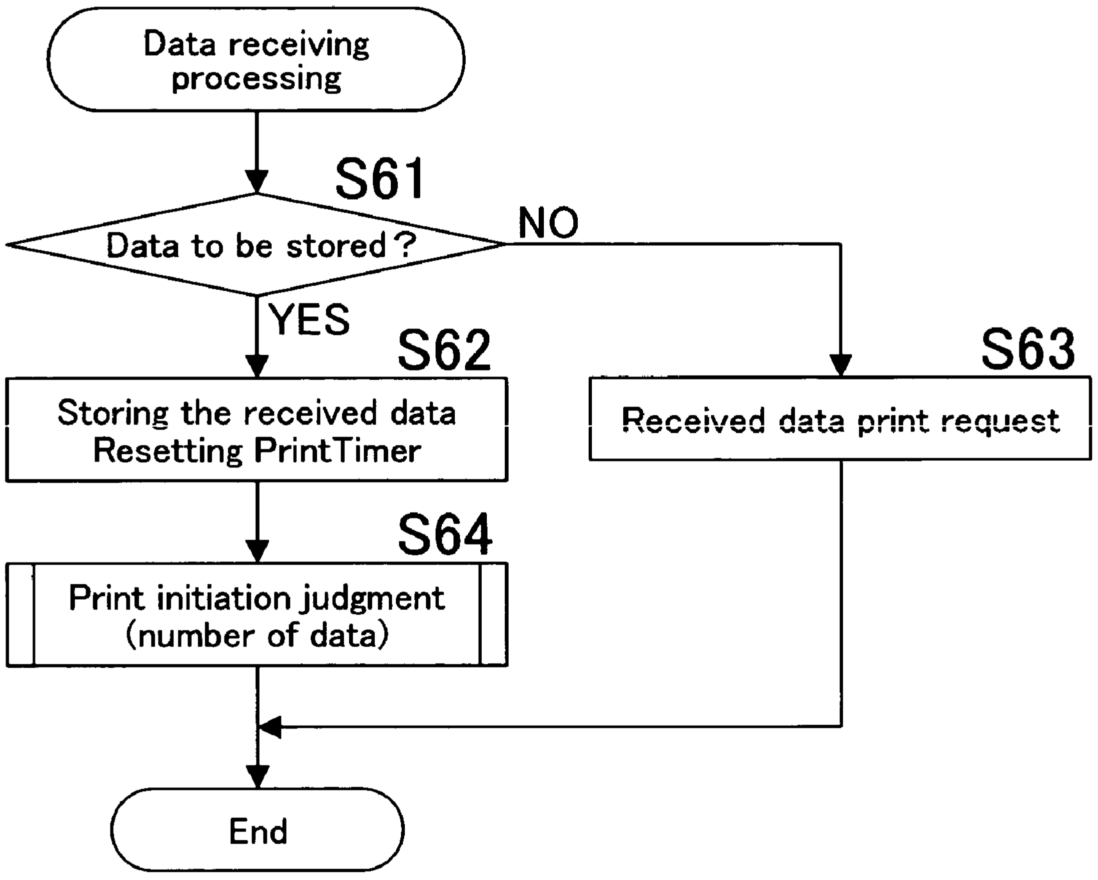
FIG. 16 is a flowchart showing the interrupt control processing to be executed at the time of receiving data in the middle of the processing in the main flow chart shown in FIG. 15.

If there is an interruption for receiving data during the main routine control, the data receiving processing shown in FIG. 16 will be executed.

In the processing shown in FIG. 16, at Step S61, it is discriminated whether the received data is data to be stored in a box. If the data is not data to be stored (NO at Step S61), it is discriminated as normal printing. At Step S63, a print request for the received data is issued, and then the interruption processing terminates. This print request is judged during the print main processing of Step S53 in the main flowchart shown in FIG. 15, and printing is executed.

On the other hand, if the received data is data to be stored (YES at Step S61), at Step S62, the received data is stored in a specified box and the timer is reset. Then, the routine proceeds to Step S64. At Step S64, after the completion of executing the print initiation judgment processing based on the number of data, the interrupting processing terminates.

The print initiation judgment processing of Step S64 is the same as the print initiation judgment processing shown in FIG. 7. Accordingly, the explanation will be omitted.

Accordingly, when the number of stored data has reached the set number of data, all of the stored data will be automatically printed.

Figure 17:
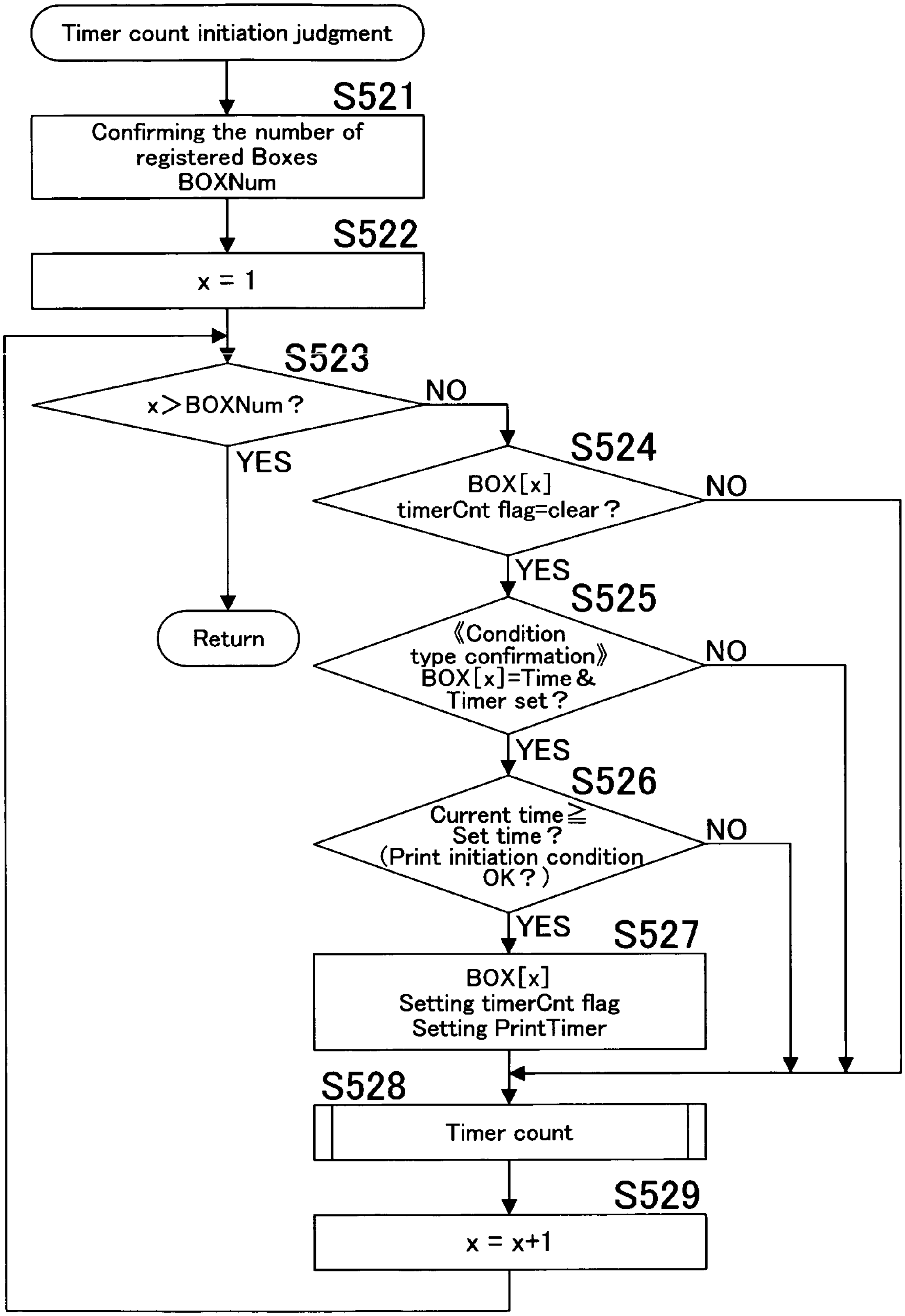
FIG. 17 is a flowchart showing the timer count initiation judgment processing at Step S52 in the flowchart shown in FIG. 15.

FIG. 17 is a flowchart showing the contents of the timer count initiation judgment processing of Step S52 in FIG. 15.

The CPU 101 confirms the number of registered boxes "BoxNum" at Step S521, initializes the box number variable x at S522, and executes the following processing against all of the boxes x. That is, after confirming that x is smaller than the number of registered boxes (NO at Step S523), at Step S524, the CPU discriminates whether a timer count permission flag (hereinafter, "timerCnt flag") has been cleared. If it has not been cleared (NO at Step S524), the routine proceeds to timer count processing of Step S528.

If the timer count permission flag has been cleared (YES at Step S524), at Step S525, it is discriminated whether the box is a box to which a print initiation time and an extension timer are set. If the box is not a box to which a print initiation time and an extension timer are set (NO at Step S525), the routine proceeds to the timer count processing of Steps S528.

If the box is a box to which a print initiation time and an extension timer are set (YES at Step S525), at Step S526, the CPU 101 compares the current time with the print initiation time set to the box x to discriminate whether the condition is met (i.e., whether the current time has got to the notification time).

If the condition is not met (NO at Step S526), the routine proceeds to the timer count processing of Step S528. If the condition is met (YES at Step S526), at Step S527, the CPU 101 sets the timer count permission flag and sets the extension timer for extending the print initiation time, and then the routine proceeds to the timer count processing of Step S528. The timer count processing will be detailed. The extension timer is a time set to the box, and 10 minutes in the case of the embodiment shown in FIG. 14.

After the timer count processing, at Step S529, the box number x is incremented, and then Step S524 to S528 as mentioned above will be repeated for the next box.

When the processing of Step S524 to Step S528 is completed with respect to all of the boxes (YES at Step S523), the routine returns.

Figure 18:
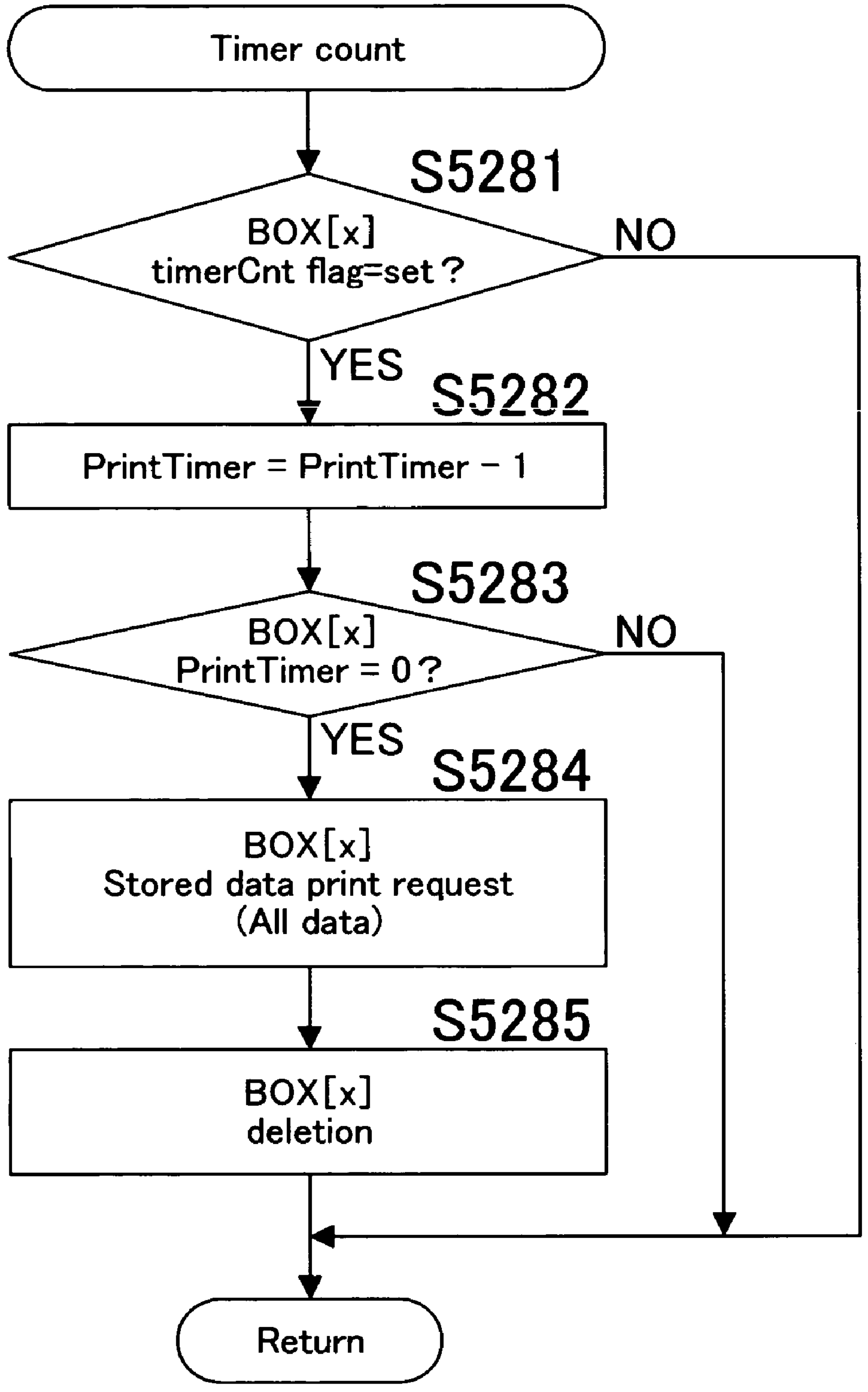
FIG. 18 is a flowchart showing the timer count processing at Step S528 in the flowchart shown in FIG. 17.

The contents of the timer count processing of Step S528 is shown in FIG. 18.

In FIG. 18, at Step S5281, it is discriminated whether a timer count permission flag is set. If the flag is not set (NO at Step S5281), the routine returns. On the other hand, if the flag is set (YES at Step S5281), at Step S5282, the extension timer counting is initiated. Thereafter, at Step S5283, it is discriminated whether the timer becomes zero (whether the timer is overflowed).

If the timer is not zero (NO at Step S5283), the routine returns since the timer is in the middle of counting. If the timer is zero (YES at Step S5283), a print request for all of the data stored in the box will be issued at Step S5284 since it got to the extended print initiation time. This print request is judged during the print main processing of Step S53 in the main flowchart in FIG. 15, and printing is executed.

Next, the box in which all of the stored data were printed is deleted at Step S5285, and then the routine returns.

As mentioned above, in this embodiment, when it gets to the set print initiation time before the number of data has reached the set number, the extension timer extends the print initiation time by the set time. Therefore, it becomes possible to wait gathering all data during the extended time, which is convenient for the user delayed in creating data.

When the lacking data is stored by the extended time, the extension timer is reset at Step S62 in FIG. 16. If the number of data has not reached the set number, the timer re-counts at the timer count processing shown in FIG. 18. Therefore, the print initiation time can be further extended by the set time from the data storing timing, which enables further waiting for the lacking data.

The extension timer is also reset at Step S62 in FIG. 16 when data is stored before it gets to the print initiation time. However, since the print permission flag has not set in the judgment of Step S5281 in FIG. 18, the timer would not operate.

4) Fourth Embodiment

This embodiment is constituted as follows. That is, a print initiation time is set to each of boxes as a print initiation time, and priority is given the boxes. As for a box to which it gets to its print initiation time, a print completion time for the stored data is calculated. In cases where there is another box in which it gets to a print initiation time before the calculated print initiation time, printing adjustment among the boxes is performed depending on the priority.

Figure 19:
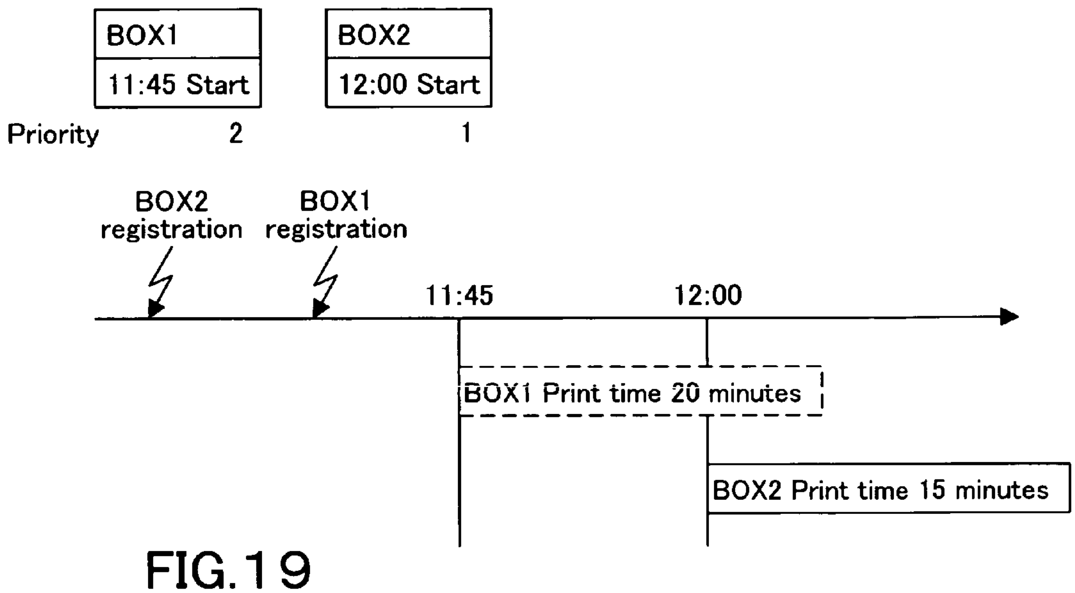
FIG. 19 is an explanatory view of print control processing according to a fourth embodiment of the present invention.
Figure 20:
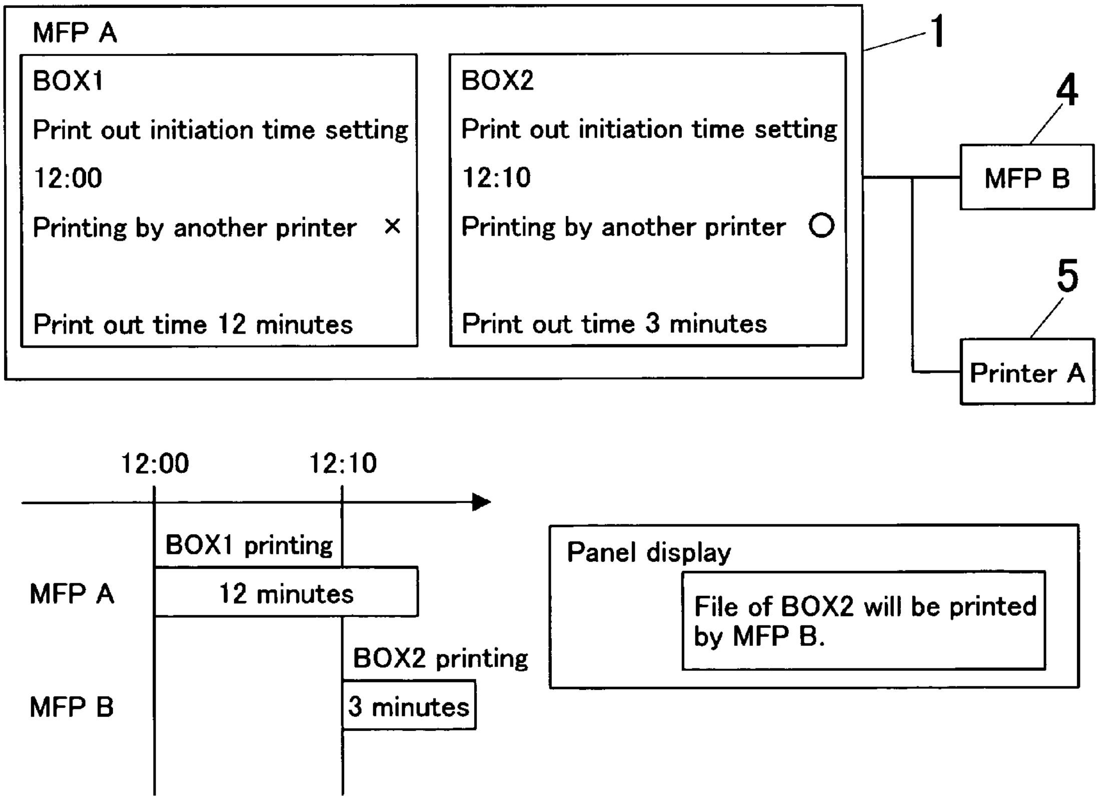
FIG. 20 is an explanatory view of the print control processing according to the fourth embodiment of the present invention.

For example, as shown in FIG. 19, the print initiation time of the box 1 and that of the box 2 are set to 11:45 and 12:00, respectively. The priority of the box 1 and that of the box 2 are set to 2 and 1, respectively. In this embodiment, an earlier registered box has higher priority, and smaller numeral of priority denotes higher priority. That is, the priority of the box 2 is higher than that of the box 1. The standard of priority can be arbitrarily decided regardless of the sequence of box registration.

When it gets to 11:45 which is a print initiation time of the box 1, the CPU 101 works out the print completion time by calculating the printing time of the data stored in the box 1. In cases where the data printing time of the box 1 is 20 minutes, if the data stored in the box 2 is printed after the print completion of the data stored in the box 1, the print initiation time of the box 2 becomes 12:05.

Accordingly, by comparing priority of the boxes 1 and 2, print adjustment is performed so that the data stored in the box 2 with higher priority has priority.

Concretely, for example, the data stored in the box 1 is printed by another data printing apparatus, or the data in the box 1 is printed after the print completion of the data stored in the box 2, or the printing of the data stored in the box 1 is continued until it gets to the print initiation time for the box 2 and the remaining printing operation is performed after the print completion of the box 2. A method to be employed can be set to each box in advance.

As mentioned above, the print adjustment depending on priority can solve the problem that the printing for a box with higher priority is delayed and therefore the obtaining of the print by the user of the box is delayed.

To the contrary, in cases where the box 1 is higher than the box 2 in priority and the print initiation time of the box 1 is earlier than that of the box 2, if it gets to the print initiation time for the box 2 by the print completion time of the data of the box 1, the following processing will be executed.

As shown in FIG. 12, for example, it is assumed that the print initiation time of the box 1 and that of the box 2 are set to 12:00 and 12:10, respectively, and that the box 1 is higher in priority than the box 2.

When it gets to 12:00 which is a print initiation time of the box 1, the CPU 101 initiates printing of the data stored in the box 1. If the printing time for the box 1 is 12 minutes, the data stored in the box 1 is still being printed even if it gets to 12:10 which is a print initiation time of the box 2.

Therefore, the CPU 101 causes the printing of the data stored in the box 2 after completion of printing the data stored in the box 1, or transfers the data stored in the box 2 to another printing apparatus 4 to print them when it gets to 12:10 which is a print initiation time. Which option is to be employed can be decided based on the print admissibility of another printing apparatus set in advance. In cases where the printing is performed by another printing apparatus, which is displayed on the operation panel 130 to notify it to the user.

As explained above, by making another printing apparatus print the data stored in a box whose print initiation time is later, it becomes possible to quickly obtain prints with less waiting time.

Furthermore, in this case, it can be constituted as follows. That is, a waiting permissible time period is set each box. If printing of the data stored in the box 1 is to be completed within the waiting permissible time, the printing of the data stored in the box 2 is executed after completion of printing the data stored in the box 1. On the other hand, if printing of the data stored in the box 1 is to be completed after the waiting permissible time, the printing of the data stored in the box 2 is printed by another printing apparatus.

Figure 21:
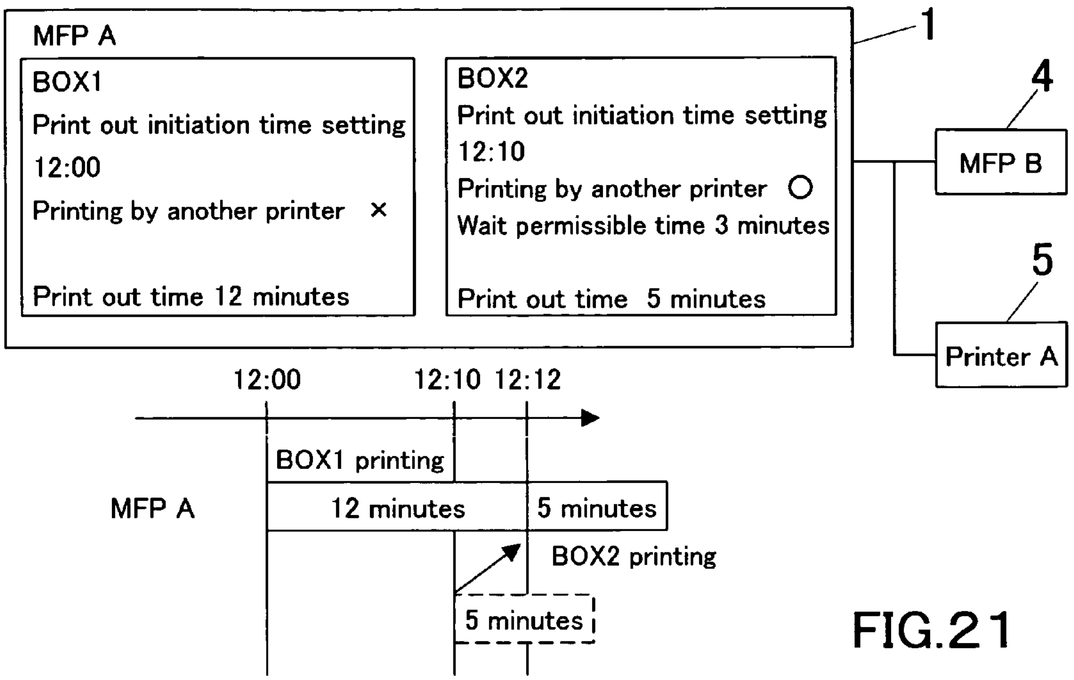
FIG. 21 is an explanatory view of the print control processing according to the fourth embodiment of the present invention.

For example, as shown in FIG. 21, it is assumed that the print initiation time for the box 1 and that for the box 2 are set to 12:00 and 12:10, respectively, and that the waiting permissible time for the box 2 is set to 3 minutes and the box 1 is higher in priority than the box 2.

When it gets to 12:00 which is a print initiation time for the box 1, the CPU 101 initiates the printing of the data stored in the box 1. In cases where the printing for the box 1 takes 12 minutes, the printing for the box 1 will be still executing even if it gets to 12:10 which is the print initiation time for the box 2.

Accordingly, the CPU 101 calculates the print completion time for the box 1 when it gets to 12:10 which is the print initiation time for the box 2. In this example, the printing for the box 1 will be completed at 12:12. The CPU 101 compares the time from the print initiation time for the box 2 to the print completion time for the box 1 and the waiting permissible time for the box 2. As a result, in cases where the print initiation for the box 2 can wait for the print completion for the box 1, after the print completion for the box 1, the printing for the box 2 is initiated. In the example shown in FIG. 21, since the time period (2 minutes) from the print initiation time (12:10) for the box 2 to the print termination time (12:12) for the box 1 is shorter than the waiting permissible time (3 minutes), the data stored in the box 2 is printed after the completion of printing for the box 1.

Figure 22:
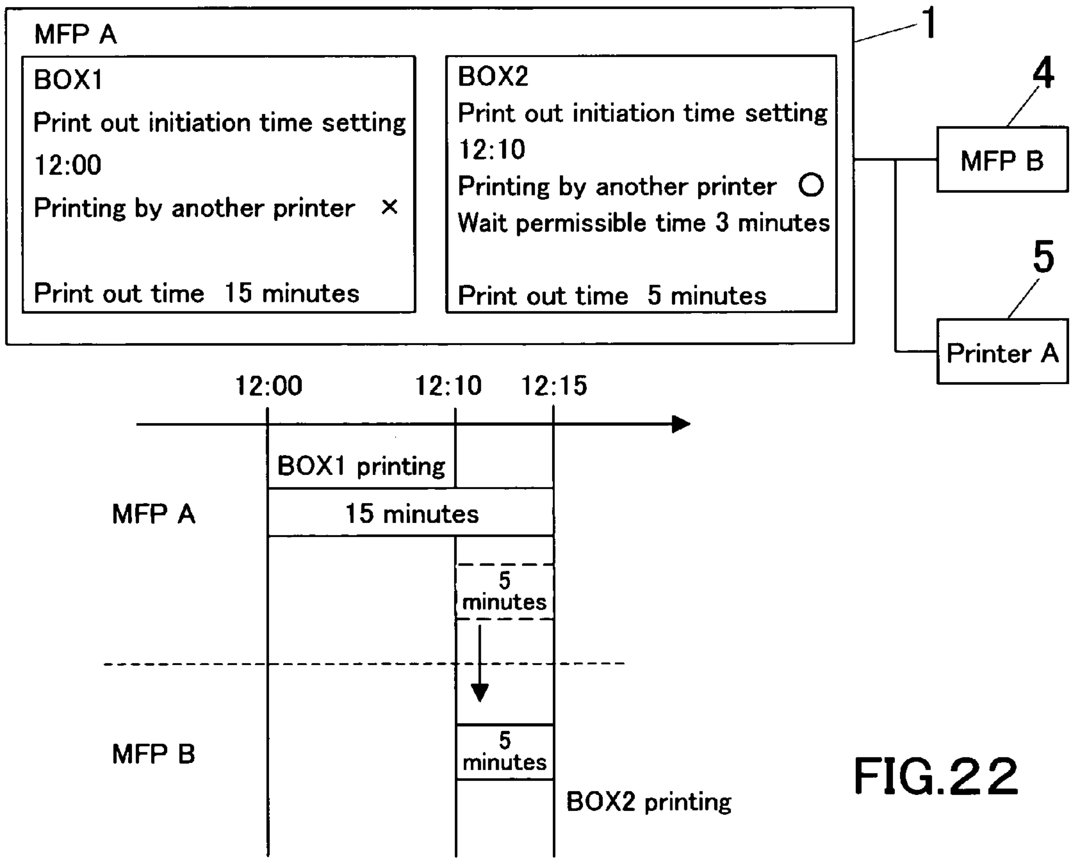
FIG. 22 is an explanatory view of the print control processing according to the fourth embodiment of the present invention.

To the contrary, as shown in FIG. 22, if the printing time for the box 1 is 15 minutes, the printing for the box 1 will be terminated at 12:15, which is 5 minutes later than the print initiation time of 12:10.

In this case, since the time period (5 minutes) from the print initiation time (12:10) for the box 2 to the print completion time (12:15) for the box 1 is longer than the waiting permissible time (3 minutes), the data stored in the box 2 is transmitted to another printing apparatus to be printed out when it gets to the print initiation time for the box 2.

Thus, depending on the waiting permissible time period, the data stored in the box 2 can be printed after completion of printing the first box 1 or can be printed by another printing apparatus, resulting in a convenient system.

The control to be executed by the CPU 101 in this embodiment will be explained with reference to the flowcharts shown in FIGS. 23 to 29. This control is executed by the operation of the CPU 101 in accordance with the control program stored in the ROM 102, etc.

Figure 23:
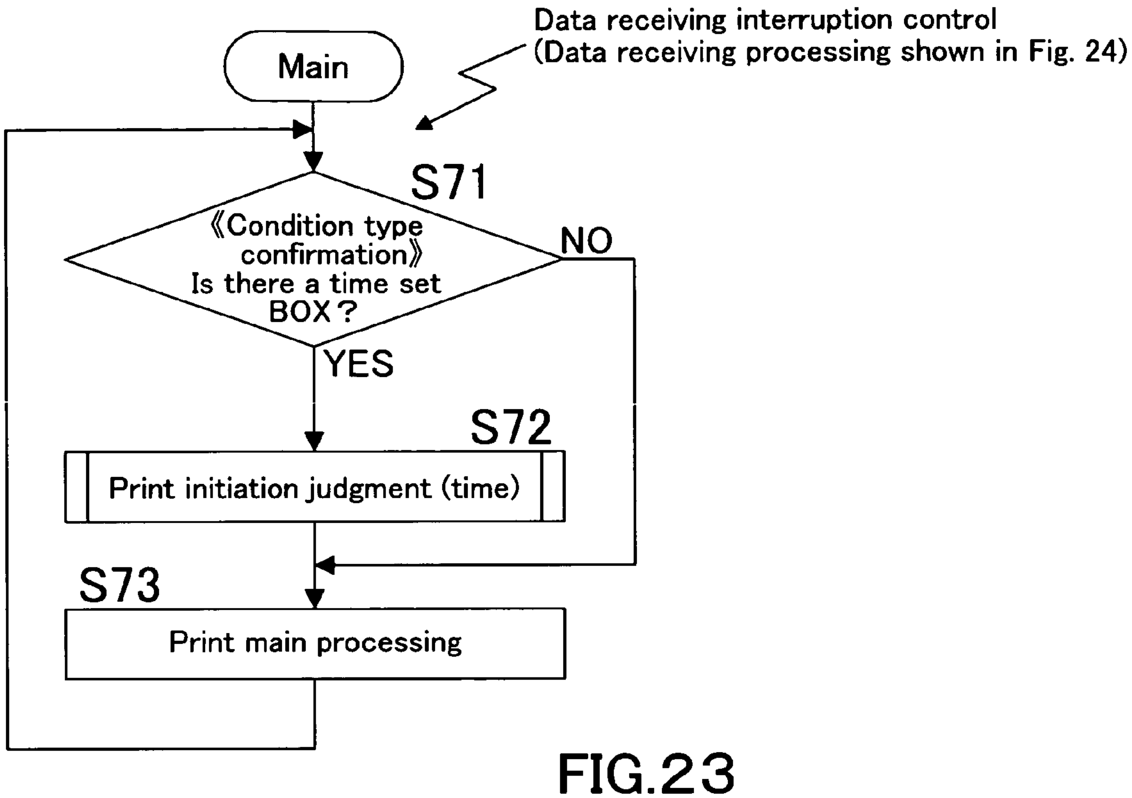
FIG. 23 is a main flowchart showing the print control processing according to the fourth embodiment of the present invention.

FIG. 23 is a flowchart showing the main routine. At Step S71 in FIG. 23, the CPU 101 confirms the setting conditions of the set information administration table shown in FIG. 3B stored in the fixed storing device 110, and discriminates whether there is a box to which a print initiation time is set as a print initiation condition. If there is no box to which a print initiation box is set (NO at Step S71), the routine proceeds to Step S73.

If there is a box to which a print initiation time is set (YES at Step S71), print initiation judgment processing based on the print initiation time is executed at Step S72, and the routine proceeds to Step S73.

At Step S73, print main processing is executed to make the image outputting apparatus 140 print the data to be printed, then the routine returns to Step S71.

Figure 24:
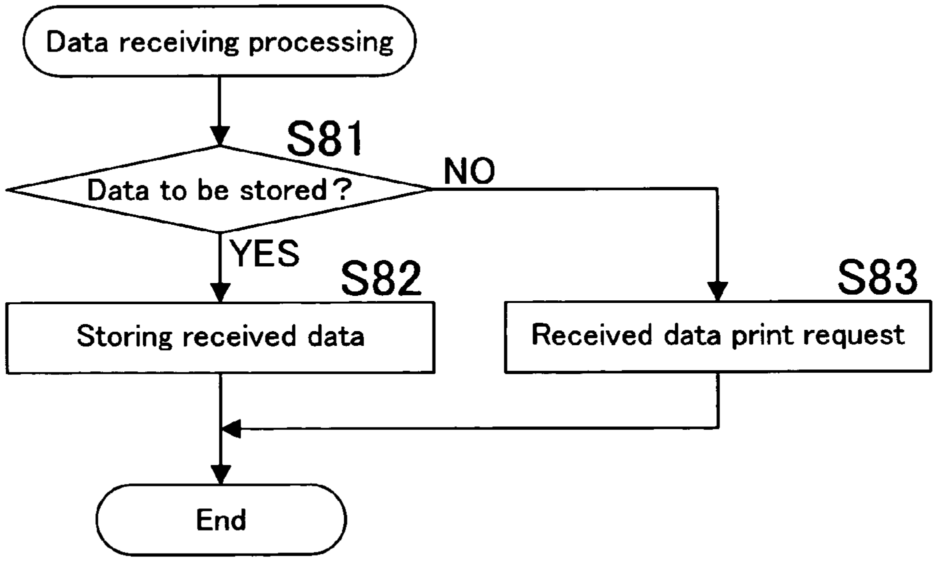
FIG. 24 is a flowchart showing the interrupt control processing to be executed at the time of receiving data in the middle of the processing in the main flow chart shown in FIG. 23.

If there is a data receiving interruption during the main routine control, the data receiving processing shown in FIG. 24 is executed. In FIG. 24, at Step S81, it is discriminated whether the received data is data to be stored in a box. If the received data is not data (NO at Step S81), it is discriminated as normal printing and a print request for the received data is issued at Step S83. Then, the interrupt processing terminates. This print request is judged during the print main processing of Step S73 in the main flowchart shown in FIG. 23 and printing is executed.

On the other hand, if the received data is data to be stored (YES at Step S81), the received data is stored in a specified box at Step S82, and then this interruption processing terminates.

Figure 25:
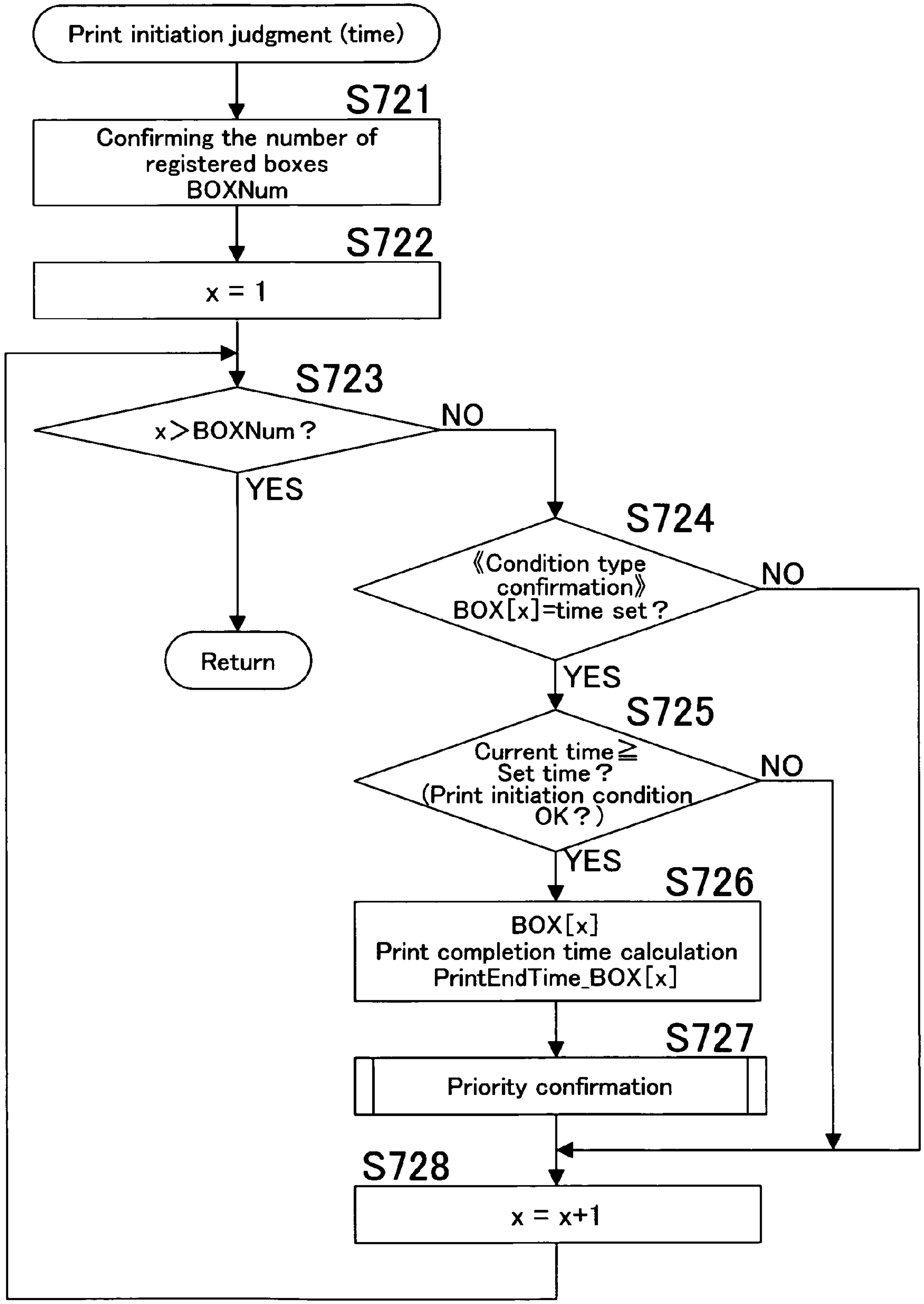
FIG. 25 is a flowchart showing the print initiation judgment processing at Step S72 in the flowchart shown in FIG. 23.

FIG. 25 shows a subroutine for the print initiation judgment processing of Step S72 shown in FIG. 23.

The CPU 101 confirms the number of registered boxes (BoxNum) at Step S721, initializes the box number variables x at Step S722, and executes the following processing with respect to all of the boxes x. That is, after confirming that x is smaller than the number of registered boxes (NO at Step S723), the CPU 101 confirms at Step S724 whether a print initiation time is set to a box x as a print initiation time condition. If no print initiation time is set (NO at Step S724), the box number variable x is incremented at Step S728, and the confirmation is also made with respect to the next box. If a print initiation time is set (YES at Step S724), the routine proceeds to Step S725. At Step S725, it is discriminated whether the condition is met (i.e., the current time has got to the print initiation time) by comparing the current time and the print initiation time.

If the condition is not met (NO at Step S725), the box number variable x is incriminated at Step S728, and the confirmation is also made with respect to the next box at Step S724. If the condition is met (YES at Step S725), at Step S726, a print completion time in the case of printing all of the data stored in the box is calculated. This calculation can be performed by a known method (e.g., a method disclosed by Japanese Unexamined Laid-open Patent Publication No. H11-129557).

Next, at Step S727, priority confirmation processing is executed. This processing will be detailed.

Subsequently, at Step S728, the box number variable x is incremented, and the processing of Steps S724 to S727 will be executed with respect to the next box.

After execution of Steps S724 to S727 with respect to all of the registered boxes (YES at Step S723), the routine returns.

Figure 26:
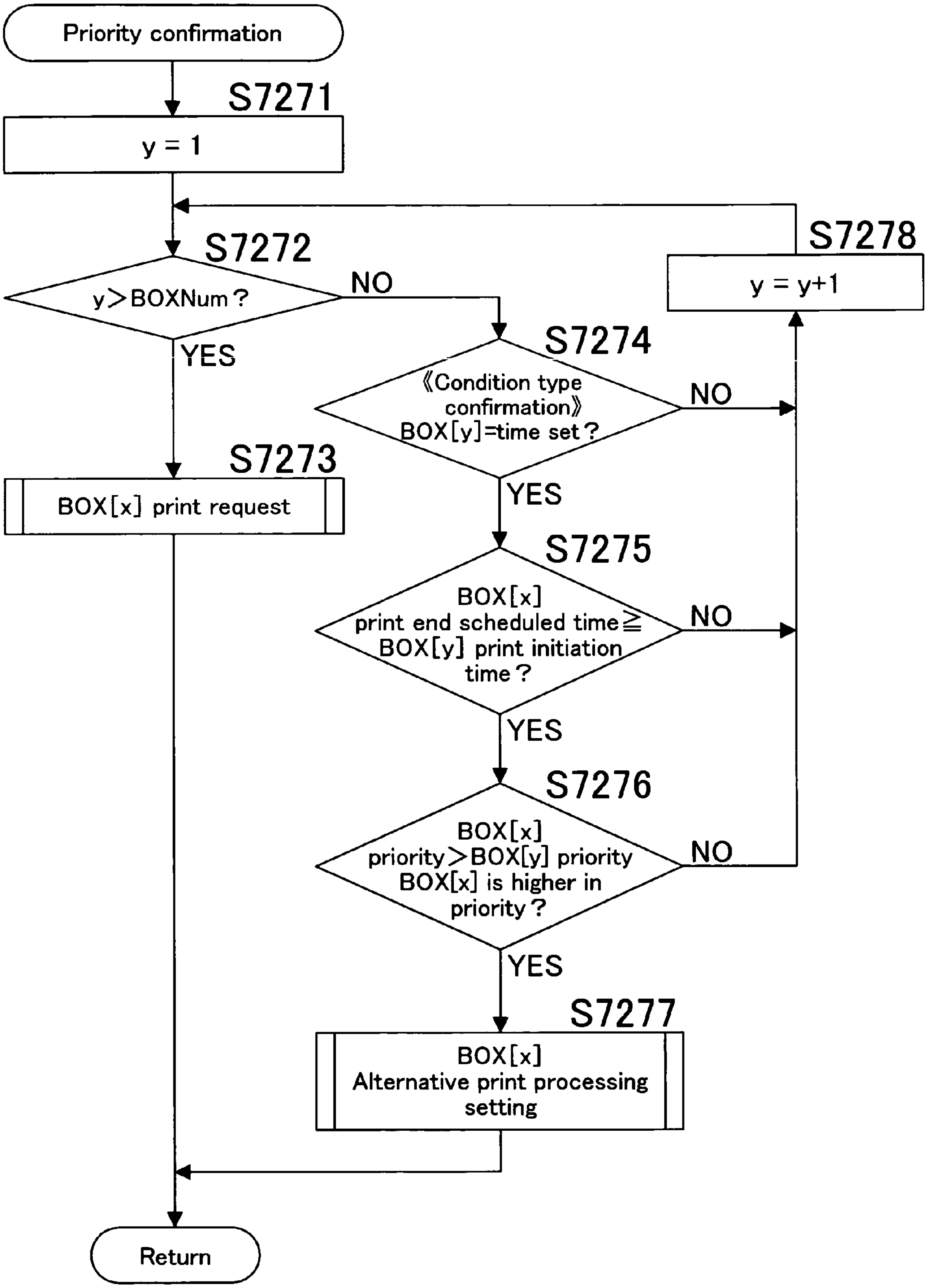
FIG. 26 is a flowchart showing the priority confirmation processing at Step S727 in the flowchart shown in FIG. 25.

FIG. 26 is a flowchart showing the contents of the priority judgment processing of Step S727 in FIG. 25. This processing compares priority of both boxes in the case where, before print completion for a box to which it gets to a print initiation time, it gets to a print initiation time for another box.

After the initialization of a box number variable "y" at Step S7271, it is confirmed at Step S7272 that "y" is smaller than the box number (NO at Step S7272), and it is discriminated at Step S7274 whether a print initiation time is set to a box y as a print initiation condition. If no print initiation time is set (NO at Step S7274), the box number variable y is incremented at Step S7278, and the confirmation is also executed with respect to the next box. If a print initiation time is set (YES at S7274), the routine proceeds to Step S7275. At Step S7275, it is discriminated whether a condition is met (i.e., whether it gets to the print initiation time for the box y before the print completion time for the box x) by comparing the calculated print completion time for the box x and the print initiation time for the box y.

If no condition is met (NO at Step S7275), since it is not necessary to perform print adjustment, the box number variable x is incremented at Step S7278. Then, the confirmation of Step S7274 for the next step is performed. If the condition is met (YES at Step S7275), at Step S7276, it is discriminated whether the priority of the box y is higher than that of the box x by comparing the priority of both boxes.

If the priority of the box y is not higher than that of the box x (NO at Step S7276), since it is not necessary to perform print adjustment, the above processing is executed via Step S7278.

If the priority of the box y is higher than that of the box x, in other words, if the priority value of the box y is smaller than that of the box x (YES at Step 7276), it gets to a print initiation time for the box y with higher priority before the print completion for the box x with lower priority. Therefore, the routine proceeds to Step S7277 to execute alternative print processing setting with respect to the box x for pint adjustment, and then the routine returns.

On the other hand, if there is no box meeting the condition with respect to all of the boxes y (YES at Step S7272), the routine proceeds to Step S7273 to execute a print request for the box x. Then, the routine returns.

Figure 27:
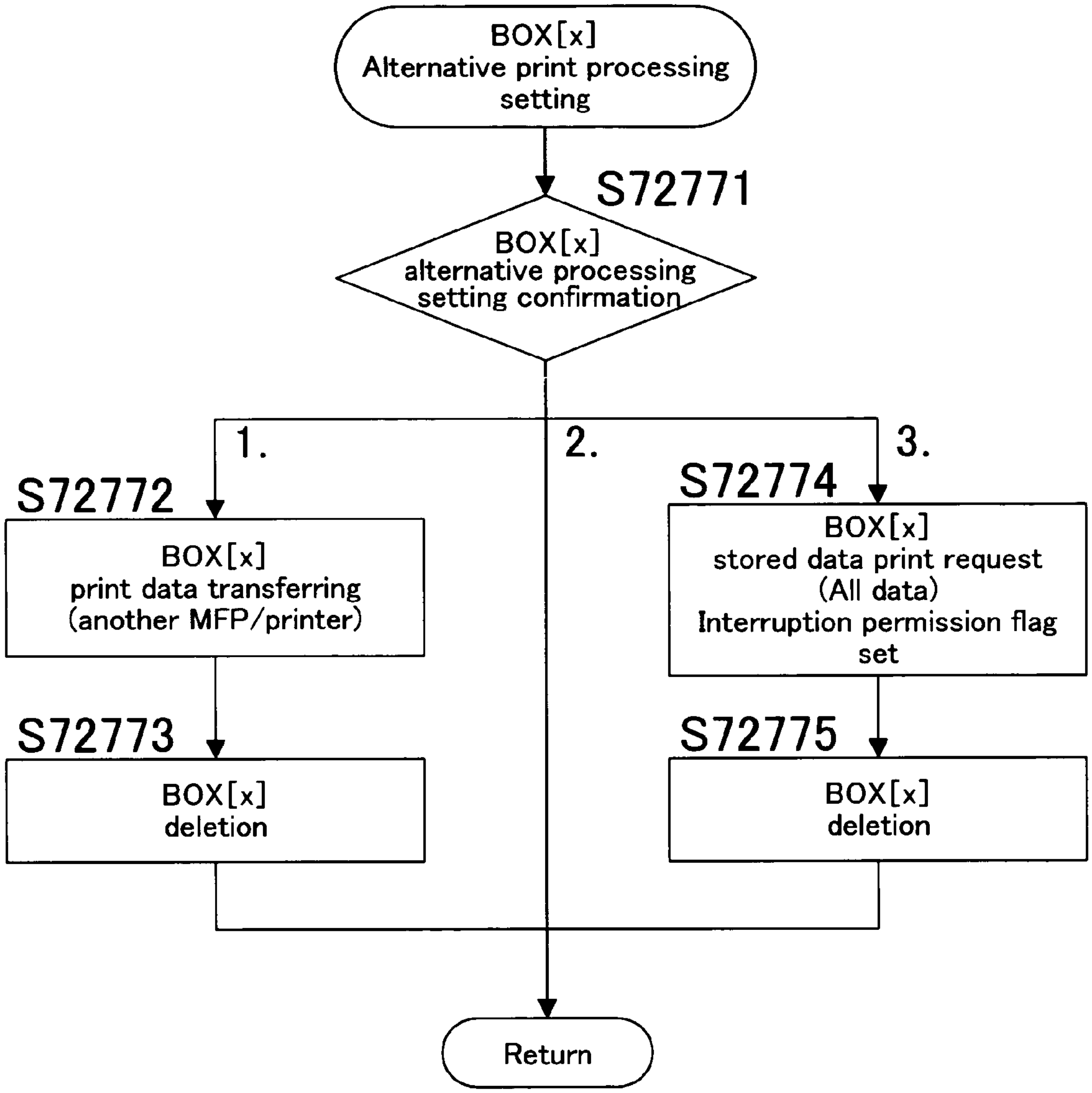
FIG. 27 is a flowchart showing the alternative print processing setting at Step S7277 in the flowchart shown in FIG. 26.

FIG. 27 is a flowchart showing the contents of alternative print processing of Step S7277 in FIG. 26.

At Step S72771, the alternative processing setting set to a box x is confirmed. In cases where "1. print with another printing apparatus" is set, at Step S72772, the print data of the box x is transferred to another image forming apparatus 4 or 5. Then, the box x is deleted S72773, and the routine returns. The another image forming apparatus to which the print data is transferred outputs the print data.

As a result of the confirmation of Step S72771, in cases where "2: Print after completion of printing the box y" is set, the routine returns as it is. Accordingly, in this case, it waits for completion of printing the box y. As a result of the confirmation of Step S72771, in cases where "3: Print halfway, and print the remaining after completion of printing the box y (sprit processing)" is set, at Step S72774, a print request for all of the data stored in the box x is issued and an interruption permission flag for allowing printing for a box y with higher priority in the middle of printing for the box x is set. Then, the box x is deleted at Step S72775 and the routine returns.

Figure 28:
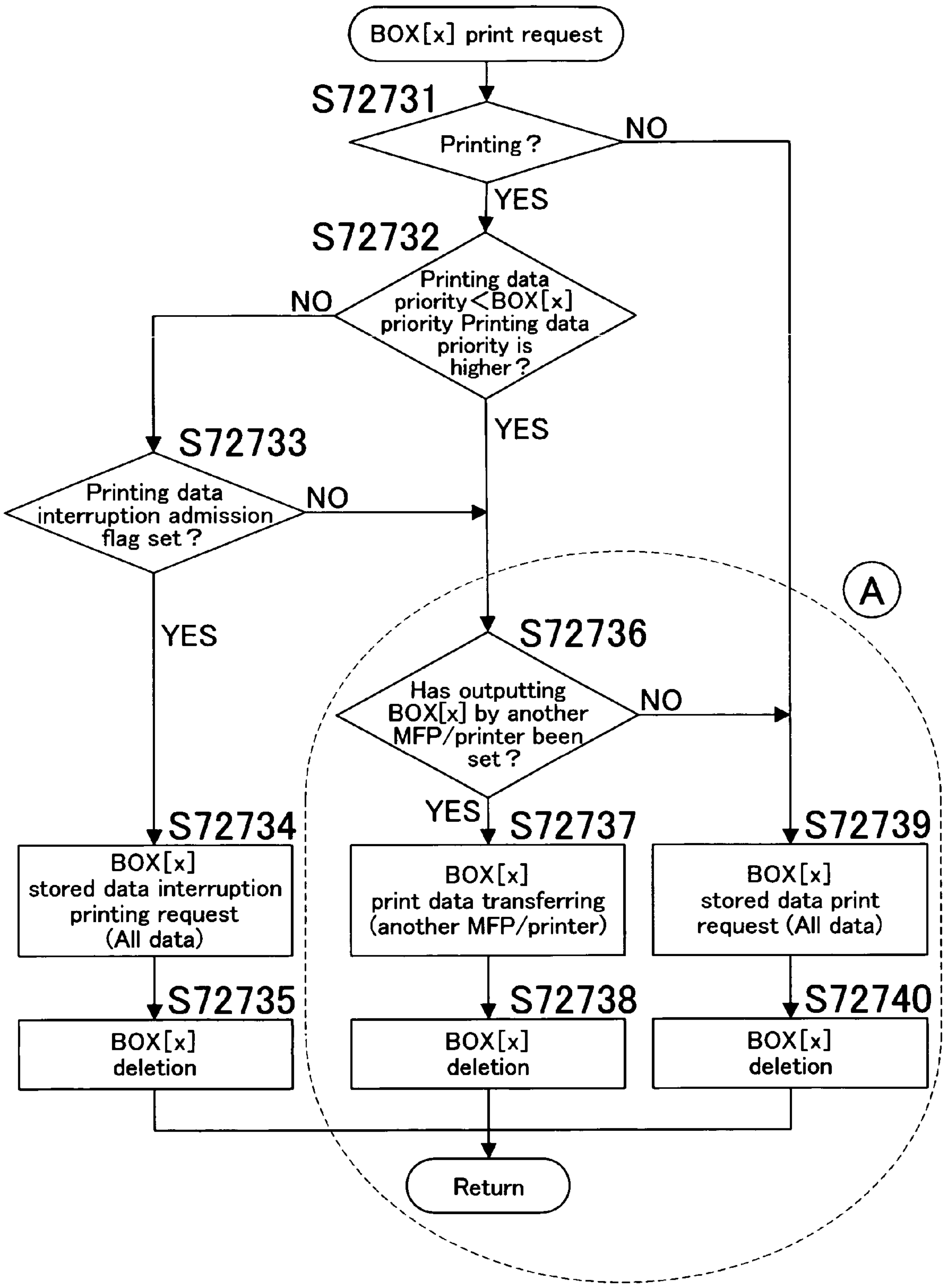
FIG. 28 is a flowchart showing the print request processing at Step S7273 in the flowchart shown in FIG. 26.

FIG. 28 is a flowchart showing the contents of the print request processing of Step S7273 in FIG. 26.

At Step S72731, it is discriminated whether data stored in another box is being printed. If it is not being printed (NO at Step S72731), the routine proceeds to Step S72739. At Step S72739, a print request for the data stored in the box x is issued. This print request is judged during the print main processing of Step S73 in the flowchart shown in FIG. 23, and the print is executed. Thereafter, the box x is deleted at Step S72740, and then the routine returns.

On the other hand, if data stored in another box is being printed (YES at Step S72731), the routine proceeds to Step S72732 to compare the priority of the box that data is being printed and the priority of the box x. If the priority of the box that data is being printed is higher (YES at Step S72732), the routine proceeds to Step S72736. At Step S72736, it is discriminated whether printing for the box x with another apparatus is set. If it is set (YES at Step S72736), the print data for the box x is transferred to another apparatus at Step S72737. Thereafter, the box is deleted at Step S72738, and the routine returns. Thus, the data stored in the box x can be printed with another apparatus without waiting for completion of the current data printing.

On the other hand, if printing for the box x with another apparatus is not set (NO at Step S72736), the routine proceeds to Step S72739. At Step S72739, a print request of the data stored in the box x is issued. In this case, after completion of the current data printing, the printing of the data stored in the box x is performed.

If it is discriminated at Step S72732 that the box x is higher in priority than the box that the data is being printed (NO at Step S72732), at Step S72733, it is discriminated whether an interruption permission flag is set to the box that data is being printed. The interruption permission flag is set at Step S72774 in FIG. 27.

If the interruption permission flag is set (YES at Step S72733), at Step S72734, an interruption print request for the data stored in the box x is issued in order to initially print the data stored in the box with higher priority. This interruption print request is judged during the print main processing of Step S73 in the main flowchart shown in FIG. 23, and the interruption print is executed.

Accordingly, the printing for the box x with higher priority can be initiated at the print initiation time set to the box x without being interrupted by the printing for a box with lower priority.

After the interruption print request, the box x is deleted at Step S72735, and then the routine returns.

If an interruption permission flag for a box that data is being printed is not set at Step S72733 (NO at Step S72733), the routine proceeds to Step S72736, in accordance with the setting of the box x, the data stored in the box x will be printed by another apparatus or printed after the completion of current data printing.

Figure 29:
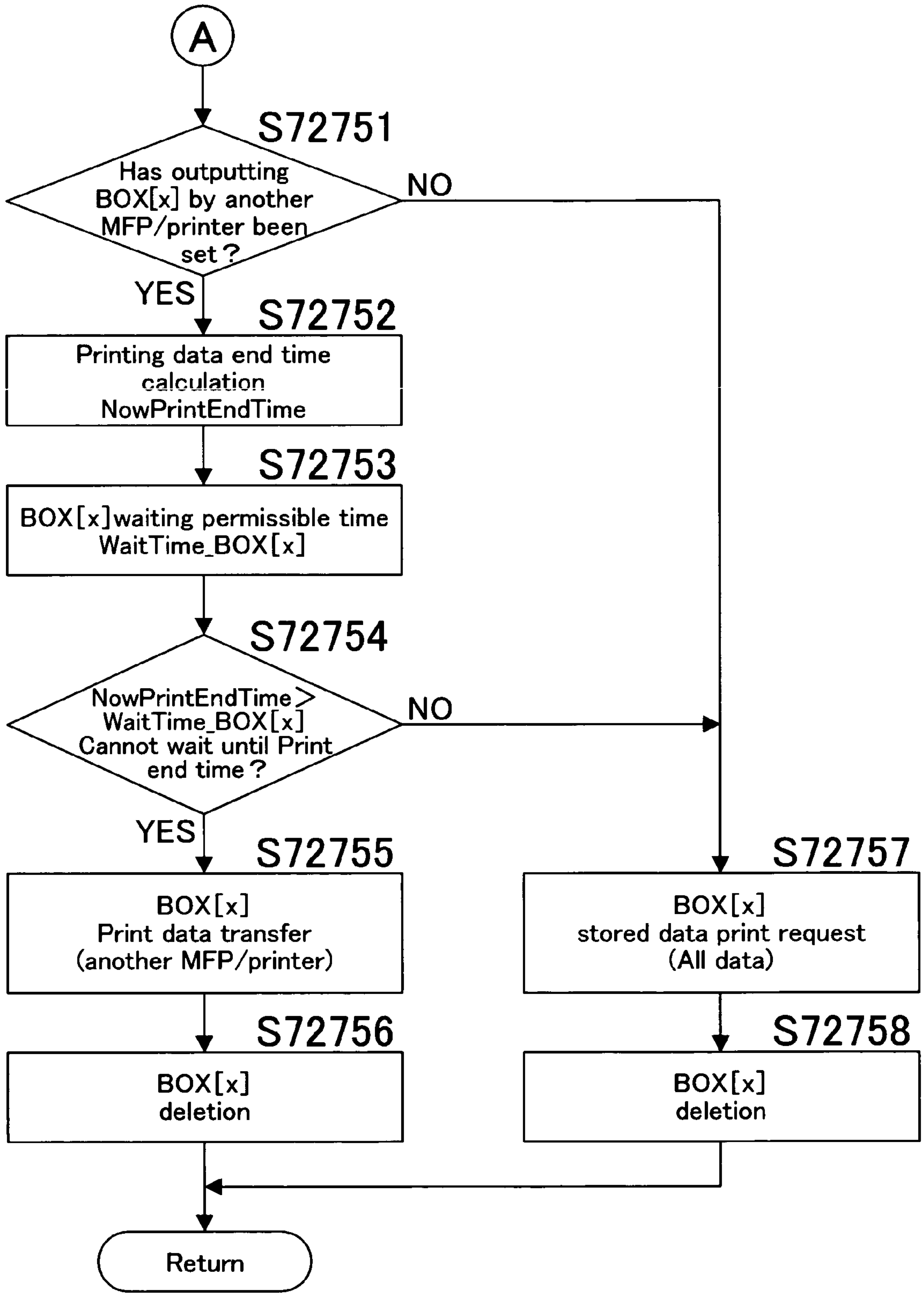
FIG. 29 is a flowchart for replacing the portion A surrounded by the dashed line in the flowchart shown in FIG. 28.

FIG. 29 is a flowchart showing the processing to be executed when the aforementioned waiting permissible time is set, which is replaced with the portion A surrounded by the dashed line in FIG. 28.

In this processing, in cases where the box that data is being printed is high in priority (YES at Step S72732 in FIG. 28), or in cases where an interruption permission flag is not set to the box that data is being printed (NO at Step S72733 in FIG. 28), the routine proceeds to Step S72751 shown in FIG. 29. At Step S72751, it is discriminated whether it is set for the box x to be executed to execute the printing by another apparatus. If it is not set (NO at Step S72751), the routine proceeds to Step S72757. At Step S72757, a print request for the data stored in the box x is issued, and the box is deleted at Step S72758. Then, the routine returns.

If it is set to execute the printing with another apparatus (YES at Step S72751), the print completion time of the data which is currently being printed is calculated at Step S72752, and the waiting permissible time of the box x is obtained at Step S72753.

Then, at Step S72754, it is discriminated whether the print completion time of the data which is currently being printed exceeds the print initiation time of the box x including the waiting permissible time, in other words, whether the print initiation of the data for the box x cannot wait until the print completion time of the data which is currently being printed. If the print initiation of the data for the box x cannot wait (YES at Step S72754), the print data for the box x is transferred to another apparatus at Step S72755, and then the box is deleted at Step S72756. Then, the routine returns.

If the print initiation of the data for the box x can wait until the print completion time of the data which is currently being printed (NO at Step S72754), a print request for the data stored in the box x is issued at Step S72757, and then the box is deleted at Step S72758. Then, the routine returns.

As explained above, a waiting permissible time is set and it is decided whether printing is executed by another apparatus or waits until the print completion of the data which is currently being printed. This increases the freedom of print setting, resulting in enhanced convenience.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A data outputting apparatus, comprising:

a box capable of storing input data files in a sorted manner which have been received from a plurality of users;

an outputting portion for outputting the data files stored in the box;

a data file number setting portion for setting a number of data files expected to be received from each of the plurality of users;

a time setting portion for setting an output initiation time at which the data files stored in the box are forcibly output even if the number of data files stored in the box has not reached the set number of data files for each user, and a notification time before the output initiation time, and a controller for making the outputting portion output the data files stored in the box when the number of data files stored in the box has reached the set number of data files for each user;

a judgment portion for judging, for each of the plurality of users, if the box has received the number of data files set for the respective user;

wherein, if the judgment portion determines that the box has not received the set number of data files from each of the plurality of users at the notification time, the controller notifies at least each of the plurality of users for whom the judgment portion has determined that the box has not received the set number of data files from the respective user that data files are lacking, and wherein the controller makes the outputting portion output the data files stored in the box when it gets to the set output initiation time even if the number of data files stored in the box has not yet reached the set number of data files for each user.

2. The data outputting apparatus as recited in claim 1, wherein the output time setting portion is equipped with a timer for extending the set output initiation time, and resets the timer to re-extend the timer when data files are stored by the extended output initiation time extended by the timer.

3. A nontransitory recording medium in which data output control program for making a computer execute steps is recorded, the steps comprising:

a step of setting a number of data files expected to be received from each of a plurality of users and stored in a box for each user, the box being capable of storing the data files in a sorted manner;

a step of setting an output initiation time at which the data files stored in the box are forcibly output even if the number of data files stored in the box has not reached the set number of data files for each user, and a notification time before the output initiation time, and a control step for outputting the data files stored in the box when the number of data files stored in the box has reached the set number of data files for each user;

a judgment step for judging, for each of the plurality of users, if the box has received the number of data files set for the respective user;

wherein, if the judgment portion determines that the box has not received the set number of data files from each of the plurality of users at the notification time, the control step notifies at least each of the plurality of users for whom the judgment portion has determined that the box has not received the set number of data files from the respective user that data files are lacking, and wherein the control step outputs the data files stored in the box even if the number of data files stored in the box has not reached the set number of data files for each user when it gets to the set output initiation time for outputting the data files stored in the box.

4. The nontransitory recording medium as recited in claim 3, further making the computer execute steps of extending the set output initiation time by a timer, and re-extending the set output initiation time by resetting the timer when data is stored by the extended output initiation time.

* * * * *